US012337591B2

(12) United States Patent
Takahashi et al.

(10) Patent No.: US 12,337,591 B2
(45) Date of Patent: Jun. 24, 2025

(54) CONVEYING DEVICE AND IMAGE FORMING APPARATUS

(71) Applicants: Yoshihiro Takahashi, Tokyo (JP); Motoharu Takahashi, Kanagawa (JP)

(72) Inventors: Yoshihiro Takahashi, Tokyo (JP); Motoharu Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 187 days.

(21) Appl. No.: 18/360,052

(22) Filed: Jul. 27, 2023

(65) Prior Publication Data

US 2024/0042775 A1 Feb. 8, 2024

(30) Foreign Application Priority Data

Aug. 2, 2022 (JP) ................................ 2022-123466

(51) Int. Cl.

| | |
|---|---|
| ***B41J 11/00*** | (2006.01) |
| ***B41J 13/26*** | (2006.01) |
| ***B65H 7/06*** | (2006.01) |
| ***B65H 7/10*** | (2006.01) |
| ***B65H 7/14*** | (2006.01) |

(Continued)

(52) U.S. Cl.

CPC ............ *B41J 11/008* (2013.01); *B41J 11/007* (2013.01); *B41J 11/0095* (2013.01); *B41J 13/26* (2013.01); *B65H 7/06* (2013.01); *B65H 7/10* (2013.01); *B65H 7/14* (2013.01); *B65H 9/002* (2013.01); *B65H 9/103* (2013.01); *B41J 2025/008* (2013.01); *B41J 2203/011* (2020.08); *B65H 2511/24* (2013.01); *B65H 2511/522* (2013.01);

(Continued)

(58) Field of Classification Search

CPC ..... B41J 11/008; B41J 11/007; B41J 11/0095; B41J 13/26; B41J 2025/008; B41J 2203/011; B65H 7/06; B65H 7/10; B65H 7/14; B65H 9/002; B65H 9/103; B65H 2511/24; B65H 2511/522; B65H 2553/42; B65H 2701/1315; B65H 2801/06

See application file for complete search history.

(56) References Cited

U.S. PATENT DOCUMENTS

2018/0273323 A1* 9/2018 Yamane ................ B65H 9/002
2019/0241385 A1* 8/2019 Kaneko ................. B65H 5/062

(Continued)

FOREIGN PATENT DOCUMENTS

JP 2005-173237 A 6/2005
JP 2014-088263 A 5/2014
JP 2020-082393 A 6/2020

*Primary Examiner* — Henok D Legesse
(74) *Attorney, Agent, or Firm* — IPUSA, PLLC

(57) ABSTRACT

A conveying device includes a conveyor, a detector, and circuitry. The conveyor conveys a recording medium in a conveyance direction. The detector detects a skew amount and a shift amount of a posture of the recording medium to be sent to the conveyor and detects, in parallel, end positions of the recording medium in a width direction of the recording medium intersecting with the conveyance direction, at at least three different points in the conveyance direction on one end of the recording medium in the width direction. The circuitry controls an operation of the conveyor and causes the detector to detect a corner folded portion of the recording medium based on the end positions of the recording medium in the width direction detected at the at least three different points.

5 Claims, 18 Drawing Sheets

(51) Int. Cl.
*B65H 9/00* (2006.01)
*B65H 9/10* (2006.01)
*B41J 25/00* (2006.01)

(52) U.S. Cl.
CPC .. *B65H 2553/42* (2013.01); *B65H 2701/1315* (2013.01); *B65H 2801/06* (2013.01)

(56) References Cited

U.S. PATENT DOCUMENTS

| | | | | |
|---|---|---|---|---|
| 2019/0276258 | A1* | 9/2019 | Egawa | B65H 7/06 |
| 2021/0031542 | A1 | 2/2021 | Kamihara et al. | |

* cited by examiner

CONVEYING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-123466, filed on Aug. 2, 2022, in the Japan Patent Office, the entire disclosure of which is hereby incorporated by reference herein.

BACKGROUND

Technical Field

Embodiments of the present disclosure relate to a conveying device and an image forming apparatus.

Related Art

In the related art, an image forming apparatus is known that forms an image on a recoding medium conveyed by a conveying device. An image forming apparatus is proposed that includes a sensor unit, a determination unit, and an estimation unit. The sensor unit outputs a signal that indicates a condition of the recoding medium. The determination unit determines whether a plurality of error conditions are satisfied based on the output signal of the sensor unit. The estimation unit estimates a cause of an error in the recording medium. For a purpose of estimating factors of error occurrence in the recording medium, the image forming apparatus detects errors with respect to a width, a center position, and side positions of the recording medium responding to output signals of a contact image sensor (CIS).

SUMMARY

In an embodiment of the present disclosure, there is provided a conveying device that includes a conveyor, a detector, and circuitry. The conveyor conveys a recording medium in a conveyance direction. The detector detects a skew amount and a shift amount of a posture of the recording medium to be sent to the conveyor and detects, in parallel, end positions of the recording medium in a width direction of the recording medium intersecting with the conveyance direction, at at least three different points in the conveyance direction on one end of the recording medium in the width direction. The circuitry controls an operation of the conveyor and causes the detector to detect a corner folded portion of the recording medium based on the end positions of the recording medium in the width direction detected at the at least three different points.

In another embodiment of the present disclosure, there is provided an image forming apparatus that includes the conveying device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
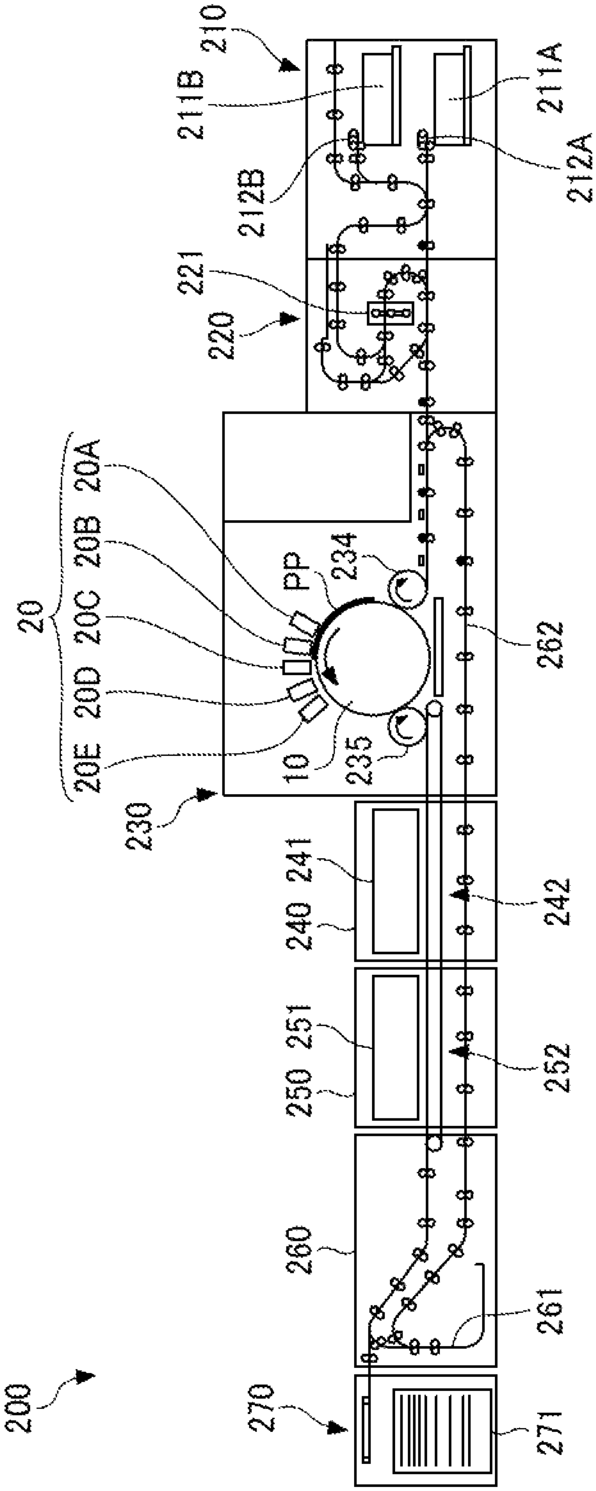
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions are given below of an image forming apparatus including a conveying device according to an embodiment of the present disclosure with reference to the drawings. An X axis direction, a Y axis direction, and a Z axis direction are indicated by arrows in drawings, which are three directions intersecting with each other. The Y axis direction extends along a conveyance direction A of a recording medium PP. The X axis direction extends along a width direction B of the recording medium PP. The width direction B of the recording medium PP is a direction that intersects with the conveyance direction A of the recording medium PP. In the present embodiment, the width direction B of the recording medium PP is orthogonal to the conveyance direction A of the recording medium PP. The Z axis direction is an example of a thickness direction of the recording medium PP. In the drawings, an arrow indicating the conveyance direction A of the recording medium PP and an arrow indicating the width direction B of the recording medium PP may be illustrated.

FIG. 1 is a schematic diagram of an image forming apparatus 200 according to an embodiment of the present disclosure. The image forming apparatus 200 illustrated in FIG. 1 is an on-demand line head inkjet recording apparatus. As illustrated in FIG. 1, the image forming apparatus 200 according to an embodiment includes a loading device 210, a pre-treatment device 220, a printing device 230, a first drying device 240, a second drying device 250, a recording-medium reversing device 260, and an ejection device 270. The image forming apparatus 200 discharges ink onto the recording medium PP to form an image. The ink is an example of liquid.

The loading device 210 includes loading trays 211A and 211B that store a plurality of recording media PP, and feeding devices 212A and 212B that separate and feed the recording media PP on the loading trays 211A and 211B one by one. The loading device 210 supplies the recording medium PP to the pre-treatment device 220.

The pre-treatment device 220 applies pre-treatment liquid as application liquid to the recording medium PP supplied from the loading device 210 as necessary. The pre-treatment device 220 includes a treatment-liquid application device 221 that applies the treatment liquid to the printing face of the recording medium PP. The treatment liquid aggregates the ink and prevents show-through.

Figure 2:
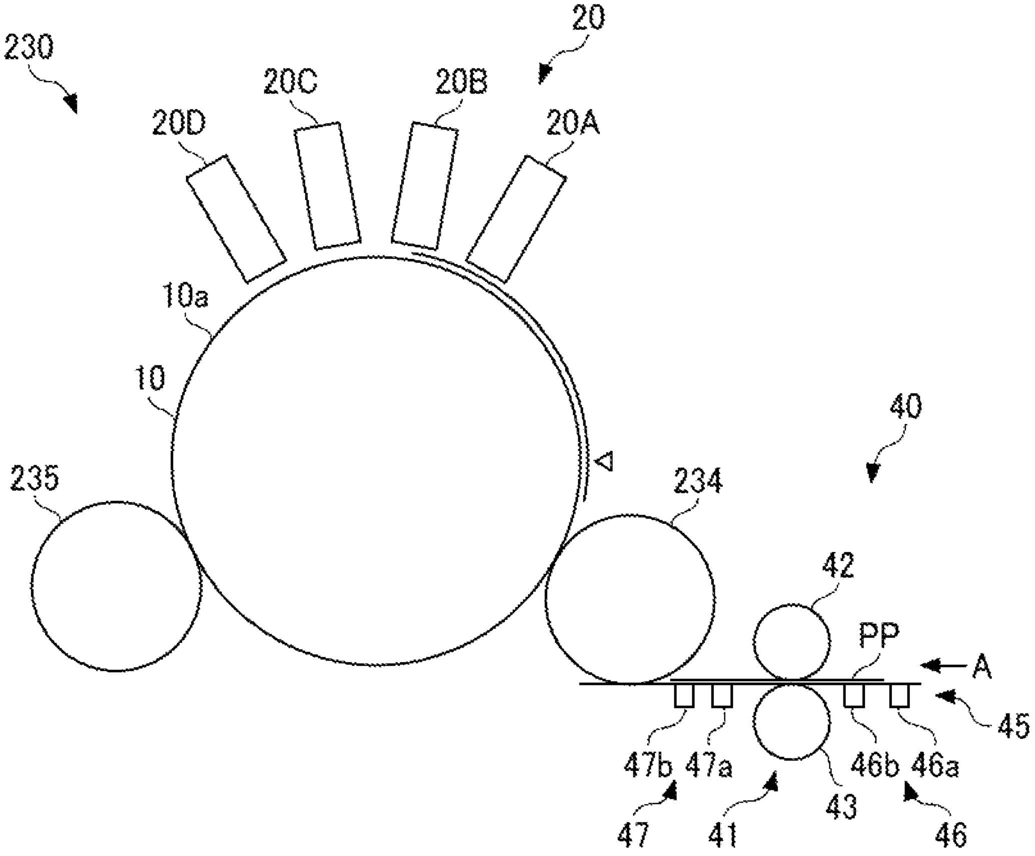
FIG. 2 is a side view of a printing device and a conveyor in the image forming apparatus of FIG. 1.

FIG. 2 is a side view of a printing device and a conveyor in the image forming apparatus of FIG. 1. The printing device 230 applies ink to the recording medium PP to perform printing. The printing device 230 includes a drum 10, a head module 20, an entrance cylinder 234, and an exit cylinder 235. The entrance cylinder 234 receives the recording medium PP conveyed from the pre-treatment device 220 and delivers the recording medium PP to the drum 10. The exit cylinder 235 receives the recording medium PP conveyed from the drum 10 and delivers the recording medium PP to the first drying device 240. A description is given of a conveying device 40 illustrated in FIG. 2 below.

As illustrated in FIG. 1 and FIG. 2, the head module 20 includes head modules 20A, 20B, 20C, 20D, and 20E. The head modules 20A, 20B, 20C, 20D, and 20E are referred to as the head module 20 unless distinguished from each other.

The head module 20A discharges cyan (C) ink. The head module 20B discharges magenta (M) ink. The head module 20C discharges yellow (Y) ink. The head module 20D discharges black (K) ink. The head module 20E may discharge other special ink. Examples of the special ink include white ink, gold ink, and silver ink.

A plurality of head modules 20 are arranged along an outer circumferential surface 10*a* of the drum 10. The head module 20 is disposed to be spaced apart from the outer circumferential surface 10*a* in the radial direction of the drum 10. The recording medium PP is placed on the outer circumferential surface 10*a* of the drum 10, and is conveyed in the circumferential direction of the drum 10 with the rotation of the drum 10.

A recording-medium gripper for holding the recording medium PP is disposed on the outer circumferential surface 10*a* of the drum 10. The drum 10 has a plurality of suction holes dispersed and formed on the outer circumferential surface 10*a*. The drum 10 generates a suction air flow directed from the suction holes toward the inside of the drum 10 to hold the recording media PP on the outer circumferential surface 10*a* of the drum 10. The drum 10 rotates, while holding the recording medium PP, to convey the recording medium PP to a position facing the head module 20. The recording medium PP is placed between the outer circumferential surface 10*a* of the drum 10 and the head module 20.

Each of the head modules 20 discharges ink onto the recording medium PP to form an image on the surface of the recording medium PP. The printing device 230 conveys the recording medium PP on which the image has been formed to the first drying device 240 illustrated in FIG. 1.

The first drying device 240 includes a heater 241 that dries the recording medium PP. The first drying device 240 includes a conveyor 242 that conveys the recording medium PP. The first drying device 240 heats the recording medium PP by the heater 241 while conveying the recording medium PP by the conveyor 242. The heater 241 irradiates the recording medium PP with, for example, infrared light to heat and dry the ink adhering to the recording medium PP.

The second drying device 250 includes a heater 251 that dries the recording medium PP. The second drying device 250 includes a conveyor 252 that conveys the recording medium PP. The second drying device 250 heats the recording medium PP by the heater 251 while conveying the recording medium PP by the conveyor 252. The heater 251 irradiates the recording medium PP with, for example, ultraviolet light to heat the ink adhering to the recording medium PP. For example, the second drying device 250 may include a cooler that cools the recording medium PP. The cooler includes, for example, a fan that blows air to the recording medium PP.

The second drying device 250 delivers the dried recording medium PP to the ejection device 270. When double-sided printing is performed, the second drying device 250 delivers the recording medium PP to the recording-medium reversing device 260.

The recording-medium reversing device 260 includes a recording-medium reversing mechanism 261 that reverses the recording medium PP and a reversing conveying device 262 that conveys the reversed recording medium PP. In the recording-medium reversing device 260 reverses the recording medium PP delivered from the second drying device 250 by the recording-medium reversing mechanism 261 and delivers the recording medium PP to the printing device 230 by the reversing conveying device 262. The printing device 230 corrects the inclination of the recording medium PP sent from the recording-medium reversing device 260 and conveys the recording medium PP to the drum 10.

The ejection device 270 includes a plurality of trays 271 on which the printed recording media PP are stacked. The ejection device 270 stacks the recording media PP delivered from the second drying device 250 in a state where the recording media PP are aligned with each other.

The recording medium PP may be a paper medium or another medium. The recording medium PP may be a sheet material, and the sheet material may be a cut sheet material. The sheet material may be an oversize sheet material such as wallpaper.

Figure 3:
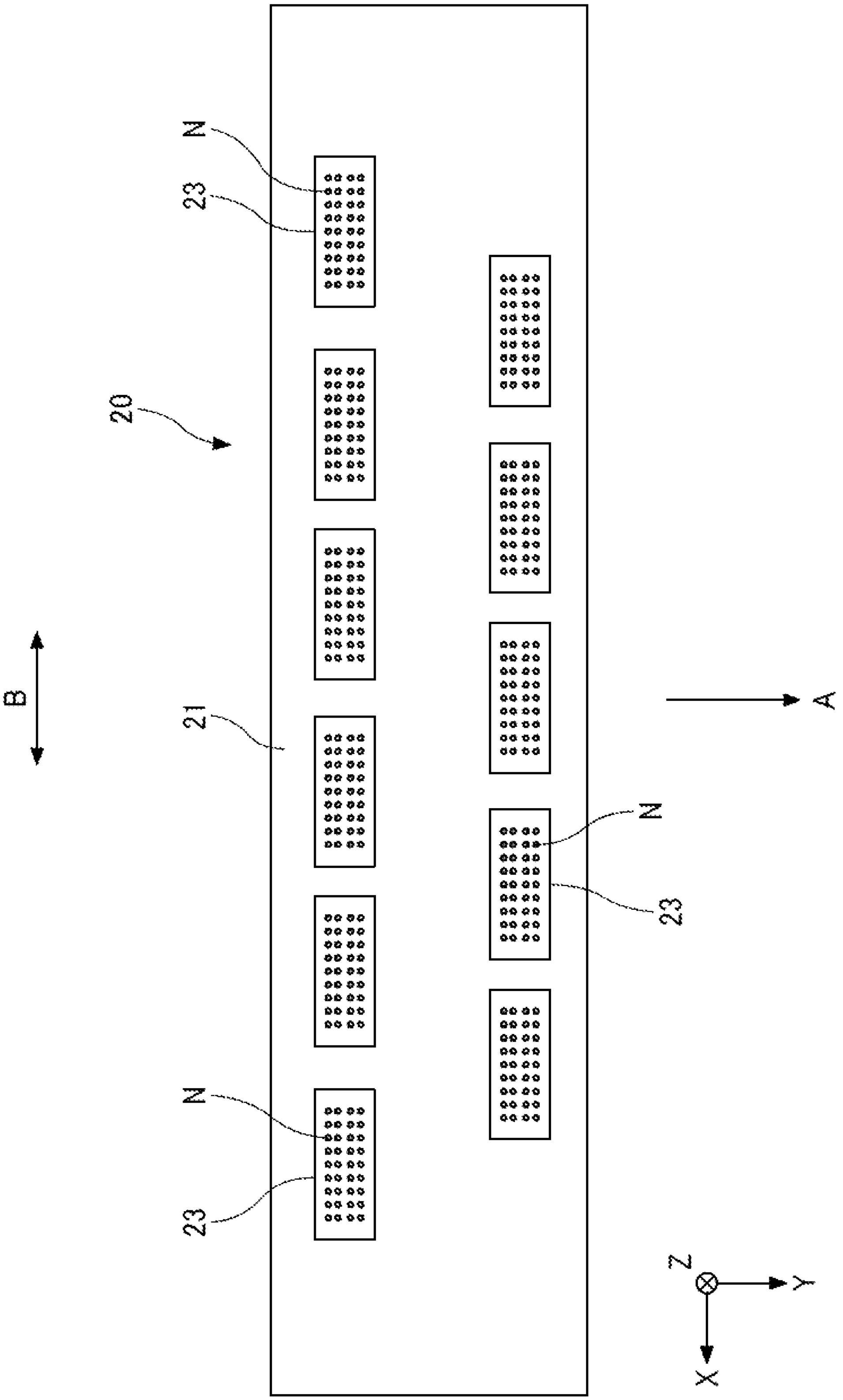
FIG. 3 is a bottom view of a nozzle face of a head module, according to an embodiment of the present disclosure.

FIG. 3 is a bottom view of a nozzle surface of the head module 20 according to the present embodiment. The head module 20 illustrated in FIG. 3 includes a plurality of recording heads (discharge heads) 23 held by a base 21. A plurality of head modules 20 are arranged in the X axis direction. The nozzle surface of the head module 20 has a plurality of nozzles N. The nozzles N form a nozzle row arranged in the X axis direction.

A recording head 23 includes an ink channel through which ink flows, a drive element for discharging the ink, a pressure chamber for applying pressure to the ink, and a nozzle plate having the nozzles from which the ink is discharged. The drive element is, for example, a piezoelectric element. As the drive element is driven, the pressure of the ink in the pressure chamber is increased to discharge the ink from the nozzles N. The ink droplets discharged from the nozzles N and on the sheet S as the recording medium.

The image forming apparatus 200 according to present embodiment may be an on-demand line-scanning inkjet recording apparatus. Accordingly, a plurality of recording heads 23 of the head module 20 are arranged in a direction orthogonal to a conveyance direction of the recording medium PP. The image forming apparatus 200 is not limited to application to a line-scanning inkjet recording apparatus, and is applicable to recording apparatuses using other methods. A recording apparatus using other method is, for example, a serial-scanning printer in which a recording head forms an image on a surface of a recording medium while moving in a main scanning direction. The main scanning direction is, for example, along the X axis direction.

Figure 4:
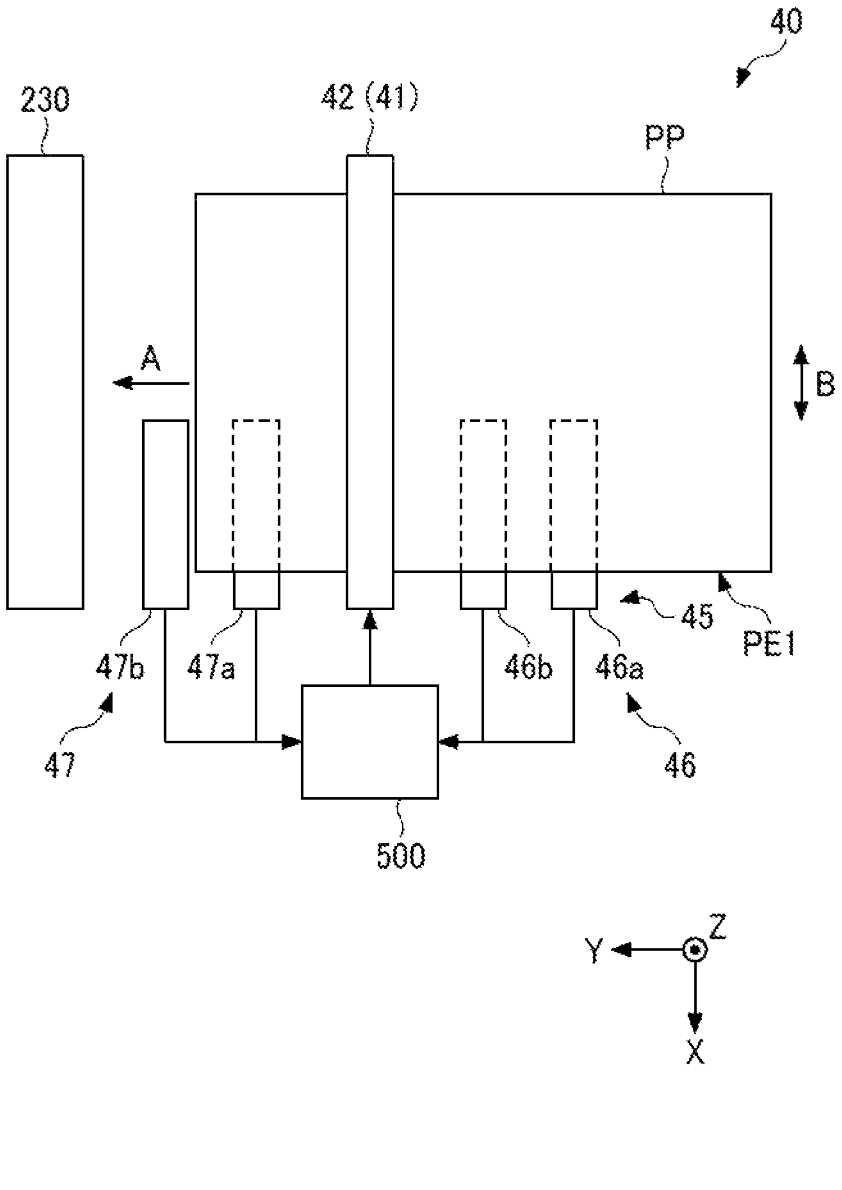
FIG. 4 is a schematic plan view of a conveying device according to an embodiment of the present disclosure.
Figure 5:
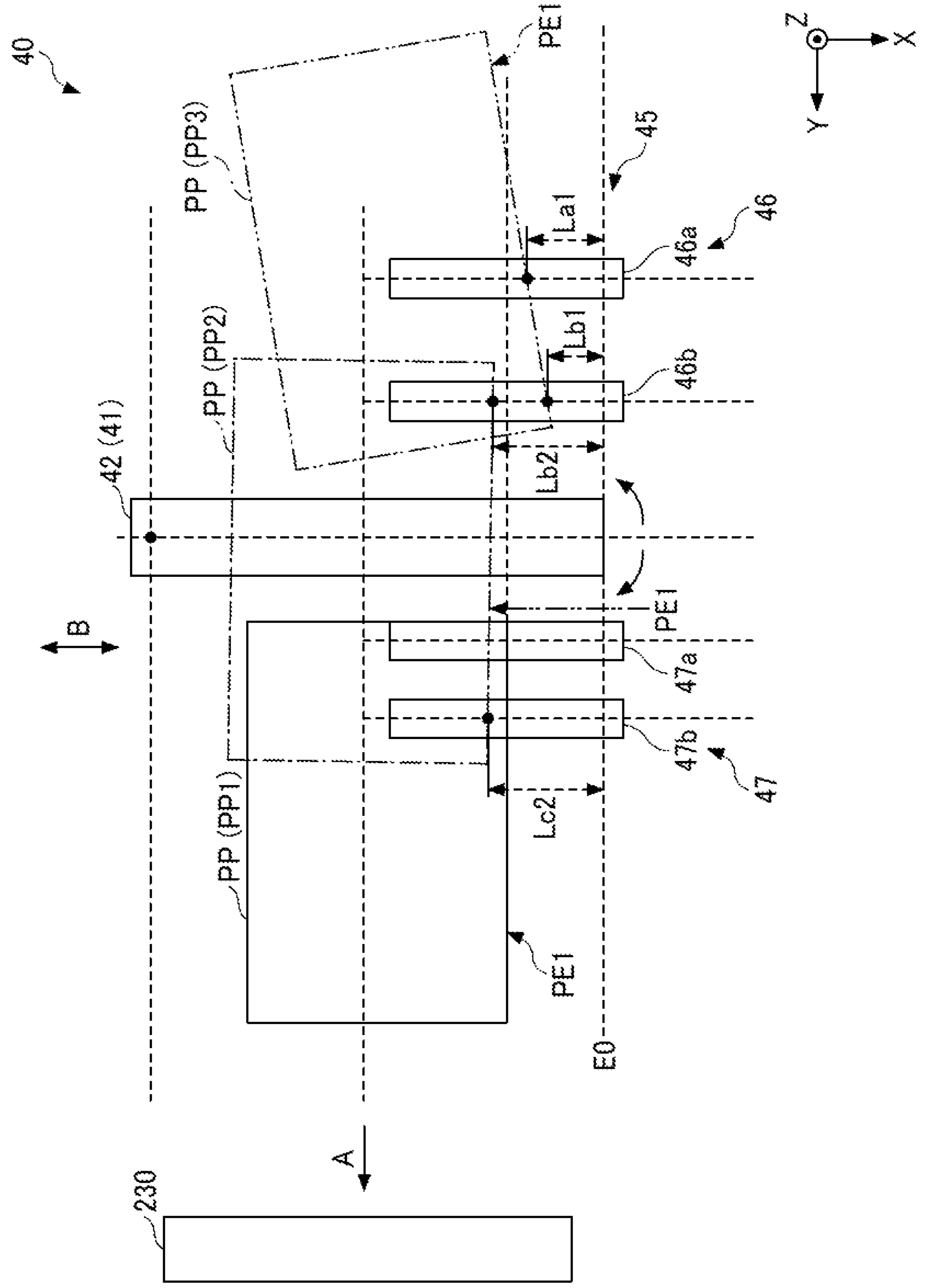
FIG. 5 is a plan view of the conveying device of FIG. 4 and a posture of a recording medium.

A description is given below of the conveying device 40. FIG. 4 is a plan view of the conveying device 40 according to the present embodiment. FIG. 5 is a plan view of the conveying device 40, and is a diagram illustrating the recording medium PP that is misaligned, according to the present embodiment. As illustrated in FIGS. 2, 4, and 5, the conveying device 40 includes a conveyor 41. The conveyor 41 conveys the recording medium PP to the printing device 230. The conveyor 41 includes shift rollers 42 and 43. The shift rollers 42 and 43 are disposed upstream from the printing device 230 in the conveyance direction A. Specifically, as illustrated in FIG. 2, the shift rollers 42 and 43 are disposed upstream from the entrance cylinder 234. The shift rollers 42 and 43 form a roller pair disposed facing each other in the thickness direction of the recording medium PP.

The shift roller 42 is disposed above the recording medium PP, and the shift roller 43 is disposed below the recording medium PP. The recording medium PP is inserted into a gap between the shift rollers 42 and 43, and is conveyed.

The shift rollers 42 and 43 can correct the misalignment of the recording medium PP. Specifically, the shift rollers 42 and 43 can correct inclination of the recording medium PP and the misalignment in the width direction B. Recording media PP (PP1 to PP3) in different postures are illustrated in FIG. 5. The recording medium PP1 is a recording medium PP that is neither inclined nor misaligned in the width direction B. The recording medium PP2 is a recording medium PP that is not inclined but is misaligned in the width direction B. The recording medium PP3 is a recording medium PP that is inclined and misaligned in the width direction B.

Figure 6:
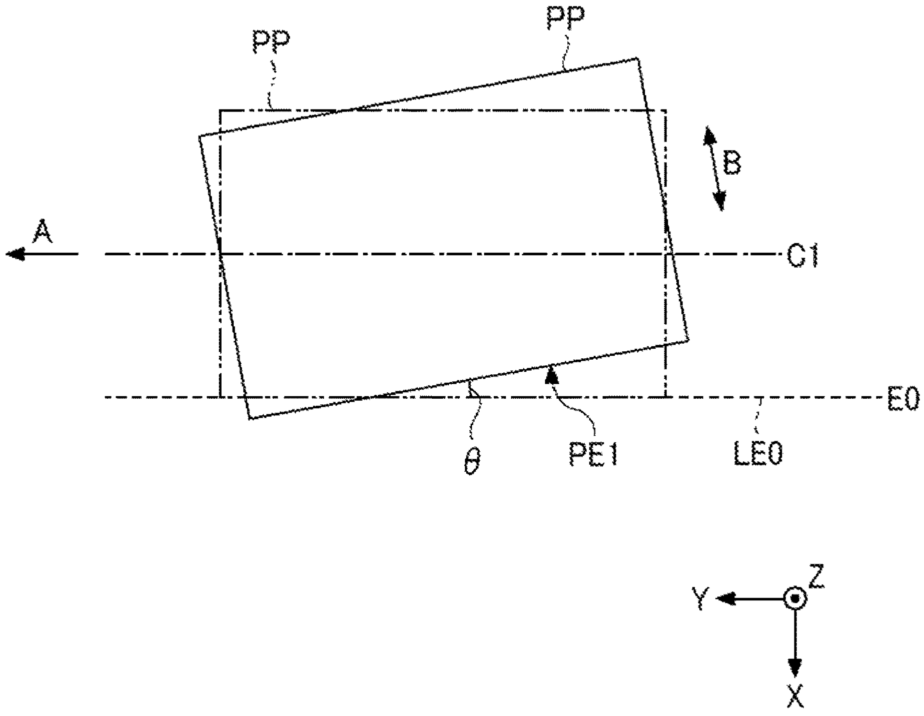
FIG. 6 is a plan view of a skewed recording medium according to an embodiment of the present disclosure.

FIG. 6 is a plan view of the recording medium PP inclined with respect to the conveyance direction, according to the present embodiment. In FIG. 6, a straight line LE0 indicating an edge specified position E0 is indicated by a broken line. The straight line LE0 extends in the Y axis direction. In the conveying device 40, an end PE1 in the width direction of the recording medium PP is preferably conveyed along the straight line LE0.

The inclination of the recording medium PP means that the recording medium PP is inclined with respect to the conveyance direction of the recording medium PP as viewed in the thickness direction of the recording medium PP. Conveyance of the recording medium PP that is inclined may be described as skewed. When the recording medium PP is inclined, the end PE1 in the width direction of the recording medium PP is inclined with respect to the straight line LE0. An amount that indicates the degree of inclination of the recording medium PP may be referred to as a "skew amount". The "skew amount" may be an angle $\theta$ of a long side of the recording medium PP with respect to the conveyance direction of the recording medium PP. The "skew amount" may include a trigonometric function related to an angle $\theta$, for example, $\tan\theta$.

Figure 7:
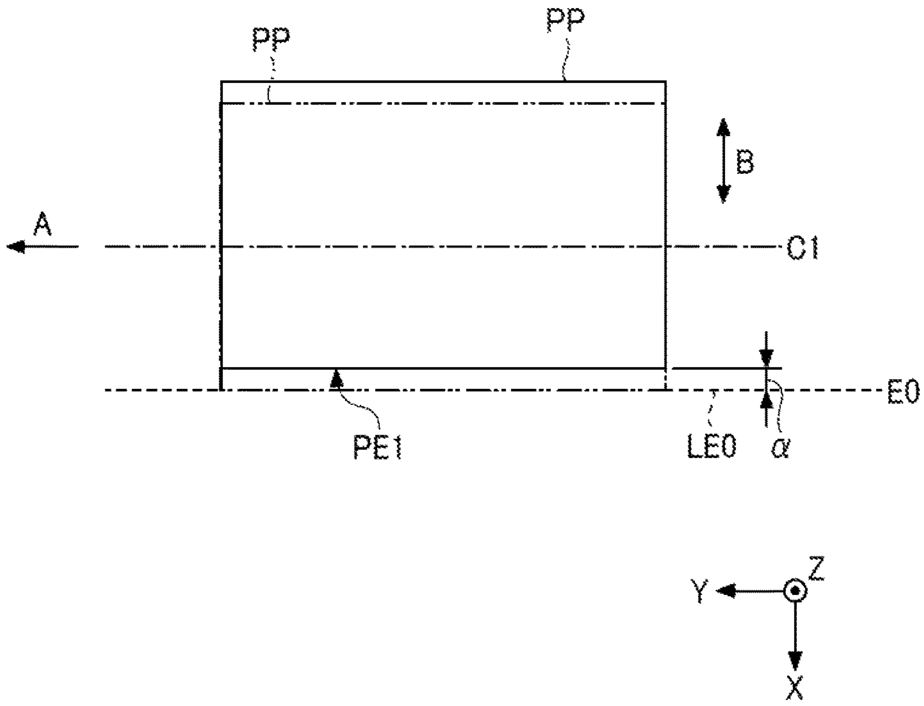
FIG. 7 is a plan view of a recording medium misaligned in a direction intersecting with a conveyance direction, according to an embodiment of the present disclosure.

FIG. 7 is a plan view of the recording medium PP misaligned in a direction intersecting with the conveyance direction, according to the present embodiment. The misalignment of the recording medium PP in a direction intersecting with the conveyance direction A means that the end PE1 in the width direction B of the recording medium PP is shifted from the straight line LE0 in the X axis direction. An amount that indicates the degree of the misalignment of the recording medium PP in the direction intersecting with the conveyance direction A is referred to as a "shift amount". The "shift amount" is a distance between the edge specified position E0 in the X axis direction and the end PE1 in the width direction B of the recording medium PP.

Figure 8:
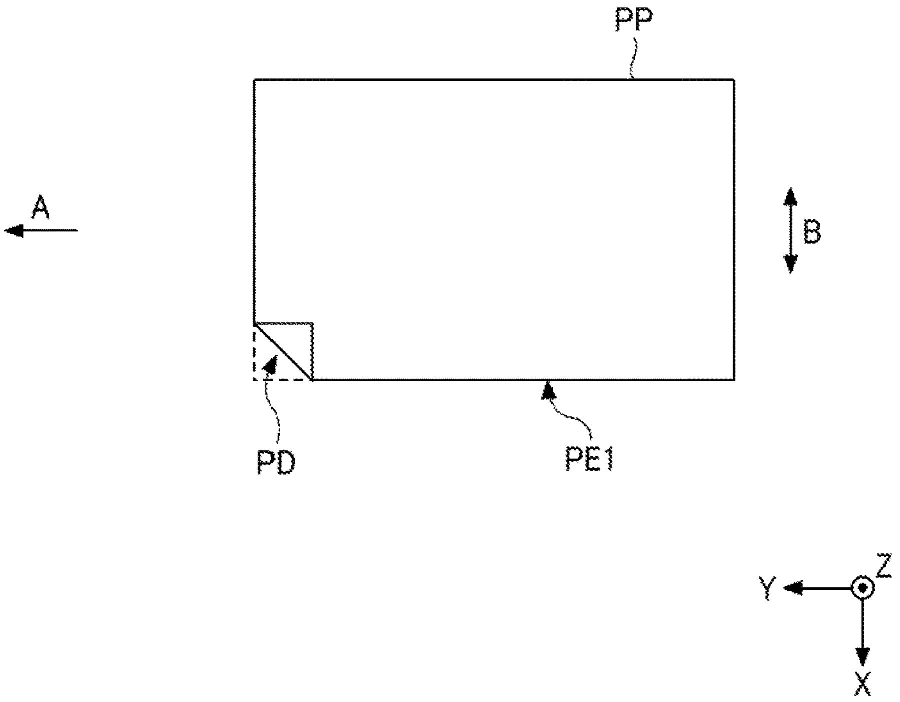
FIG. 8 is a plan view of a recording medium having a folded portion at a corner, according to an embodiment of the present disclosure.

A description is given below of a folded portion at a corner of the recording medium PP. Such a folded portion at a corner of the recording medium PP is referred to as a corner folded portion PD in the following description. FIG. 8 is a plan view of the recording medium PP having the corner folded portion PD, according to the present embodiment. For example, the recording medium PP may have the corner folded portion PD at a front corner. The corner folded portion PD means that a corner portion of the recording medium PP is bent toward the center of the recording medium PP.

The shift roller 42 illustrated in FIG. 5 is supported by bearings to be rotatable around an axis. The shift roller 42 is supported to be movable in the X axis direction and rotatable around an axis extending in the Z axis direction. For example, the bearing is movable in the X axis direction. Accordingly, the shift roller 42 can move in the X axis direction. For example, the bearing on one end in the axis direction of the shift roller 42 is rotatable around an axis extending in the Z axis direction. Accordingly, the shift roller 42 and a bearing of another end are rotatable around an axis extending in the Z axis direction with the bearing of one end serving as a rotation center. Similarly to the shift roller 42, the shift roller 43 is movable in the X axis direction and is supported to be rotatable around an axis extending in the Z axis direction.

Accordingly, the shift rollers 42 and 43 are moved in the X axis direction to correct a misalignment of the recording medium PP in the direction intersecting with the conveyance direction A of the recording medium PP. The shift rollers 42 and 43 are rotated around the axis extending in the Z axis direction to correct the inclination of the recording medium PP.

The conveying device 40 illustrated in FIGS. 2, 4, and 5 includes a detector 45 that can detect the position of the recording medium PP. The detector 45 includes a first detector 46 and a second detector 47. The first detector 46 is disposed upstream from the shift rollers 42 and 43 in the conveyance direction A of the recording medium PP. The first detector 46 can detect a skew amount β and a shift amount α. The skew amount β includes a value related to an inclination of the recording medium PP with respect to the conveyance direction of the recording medium PP. The shift amount α includes a value related to a misalignment in a direction intersecting the conveyance direction A of the recording medium PP and the thickness direction of the recording medium PP. The shift amount α indicates a degree of the misalignment, for example, in the X axis direction.

The first detector 46 includes first detectors 46*a* and 46*b*. The first detector 46*a* is disposed upstream from the first detector 46*b* in the conveyance direction A of the recording medium PP. The first detectors 46*a* and 46*b* have the same configuration. The first detectors 46*a* and 46*b* are collectively referred to as the first detector 46 unless otherwise distinguished.

The first detector 46 may be, for example, a contact image sensor (CIS). The first detector 46 may include, for example, a light emitting element such as a light emitting diode (LED) and a light receiving element such as a photodiode. The first detector 46 can detect an end position of the recording medium PP in the width direction B. The first detector 46 detects the end position of the recording medium PP in the width direction B with respect to at least three different points in the conveyance direction A with respect to the end PE1 of the recording medium PP in the width direction B. Thus, the first detector 46 can detect the skew amount β and the shift amount α.

The second detector 47 is disposed downstream from the first detector 46 in the conveyance direction A of the recording medium PP. The second detector 47 is disposed downstream from the shift rollers 42 and 43 in the conveyance direction A of the recording medium PP. The second detector 47 can detect a skew amount β and a shift amount α.

The second detector 47 includes second detectors 47*a* and 47*b*. The second detector 47*a* is disposed upstream from the second detector 47*b* in the conveyance direction A of the recording medium PP. The second detectors 47*a* and 47*b* have the same configuration. The second detectors 47*a* and 47*b* are collectively referred to as the second detector 47 unless otherwise distinguished.

The second detector 47 may be, for example, the CIS. The second detector 47 may include, for example, the light emitting element such as the LED and the light receiving element such as the photodiode. The second detector 47 can detect an end position of the recording medium PP in the width direction B. The second detector 47 detects the end position of the recording medium PP in the width direction B with respect to at least three different points in the conveyance direction A with respect to the end PE1 of the recording medium PP in the width direction B. Thus, the second detector 47 can detect the skew amount β and the shift amount α. The first detector 46 and the second detector 47 may only be detectable of the end position of the recording medium PP in the width direction B with respect to at least three points in total.

Comparative Example

Figure 9:
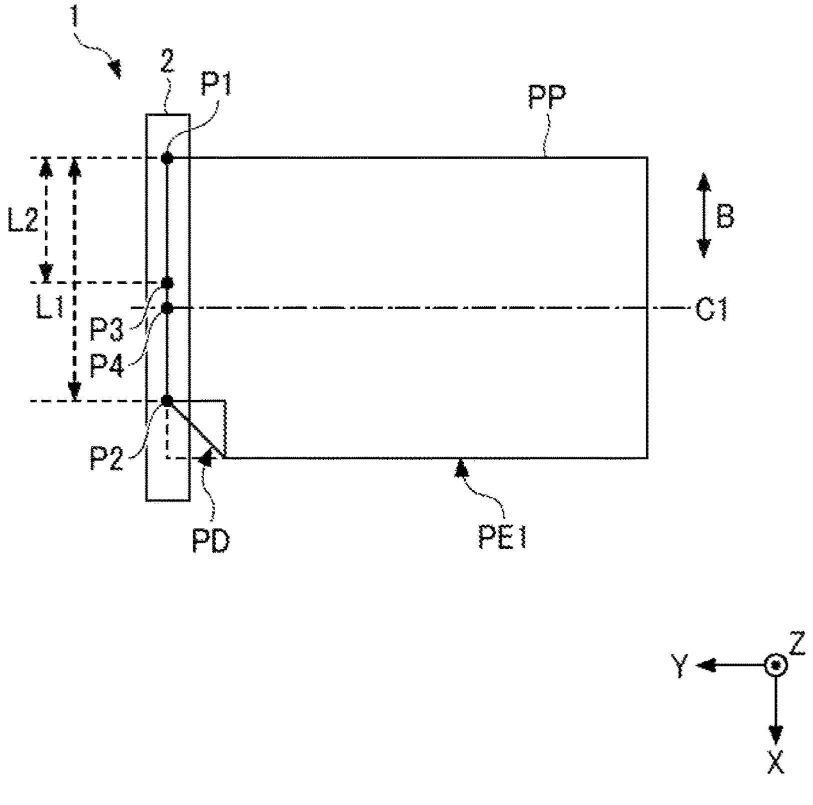
FIG. 9 is a plan view of a recording medium having a folded portion at a corner in a conveying device according to a comparative example.
Figure 10:
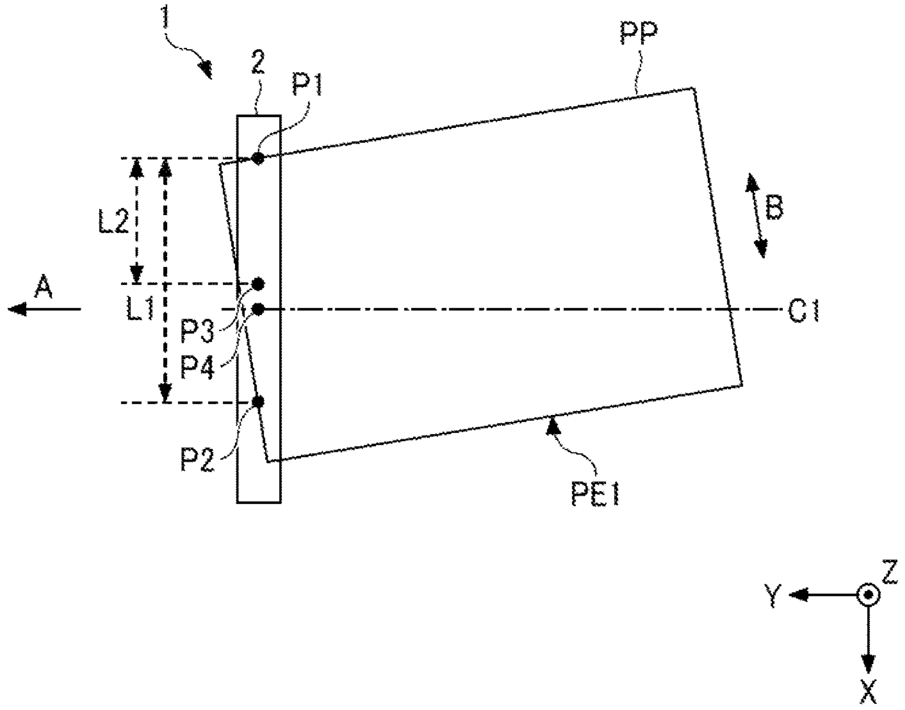
FIG. 10 is a plan view of a skewed recording medium in the conveying device according to the comparative example.

A description is given below of a comparative example with reference to FIGS. 9 and 10. FIG. 9 is a plan view of a recording medium PP having a folded portion at a corner in a conveying device according to a comparative example. FIG. 10 is a plan view of the recording medium PP skewed in a conveying device 1 according to the comparative example. The conveying device 1 according to the comparative example includes a detector 2 extending in an X axis direction. The detector 2 is longer than the width of the recording medium PP in the X axis direction. In the conveying device 1 according to the comparative example, leading end positions P1 and P2 of the recording medium PP are detected to recognize the corner folded portion PD and the skew as a state of the recording medium PP.

The conveying device 1 according to the comparative example detects leading end positions P1 and P2 of a recording medium PP. A controller of the conveying device 1 calculates an intermediate position P3 between the leading end positions P1 and P2. The controller of the conveying device 1 determines whether the intermediate position P3 and a center position P4 of the detector 2 in the X axis direction match. In a case where the intermediate position P3 and the central position P4 match, the controller of the conveying device 1 determines that a corner folded portion is present on the recording medium PP.

The conveying device 1 according to the comparative example determines that a corner folded portion PD is present on the recording medium PP illustrated in FIGS. 9 and 10. Since the recording medium PP illustrated in FIG. 9 has the corner folded portion PD, the conveying device 1 correctly detects the corner folded portion PD. Although the recording medium PP is skewed as illustrated in FIG. 10, a corner folded portion PD is not present on the recording medium PP. Thus, the conveying device 1 erroneously detects the corner folded portion PD.

The conveying device 1 according to the comparative example erroneously detects that the corner folded portion PD is present on the recording medium PP in the case illustrated in FIG. 10, determines that an error has occurred, and stops the conveyance of the recording medium PP. As described above, even in a case where the corner folded portion PD is not present on the recording medium PP and printing can be performed, the conveying device 1 may determine that an error has occurred and stop the conveyance of the recording medium PP.

In a case where the conveying device 1 according to the comparative example erroneously detects that the recording medium PP is skewed when the corner folded portion PD is present on the recording medium PP, the conveying device

1 corrects a posture of the recording medium PP to convey the recording medium PP as it is. As described above, in a case where the corner folded portion PD is present on the recording medium PP, a failure may occur that the conveying device 1 does not determine that an error has occurred and does not stop the conveyance of the recording medium PP. The conveying device 1 according to the comparative example may not correctly determine the corner folded portion PD and the skew.

Figure 11:
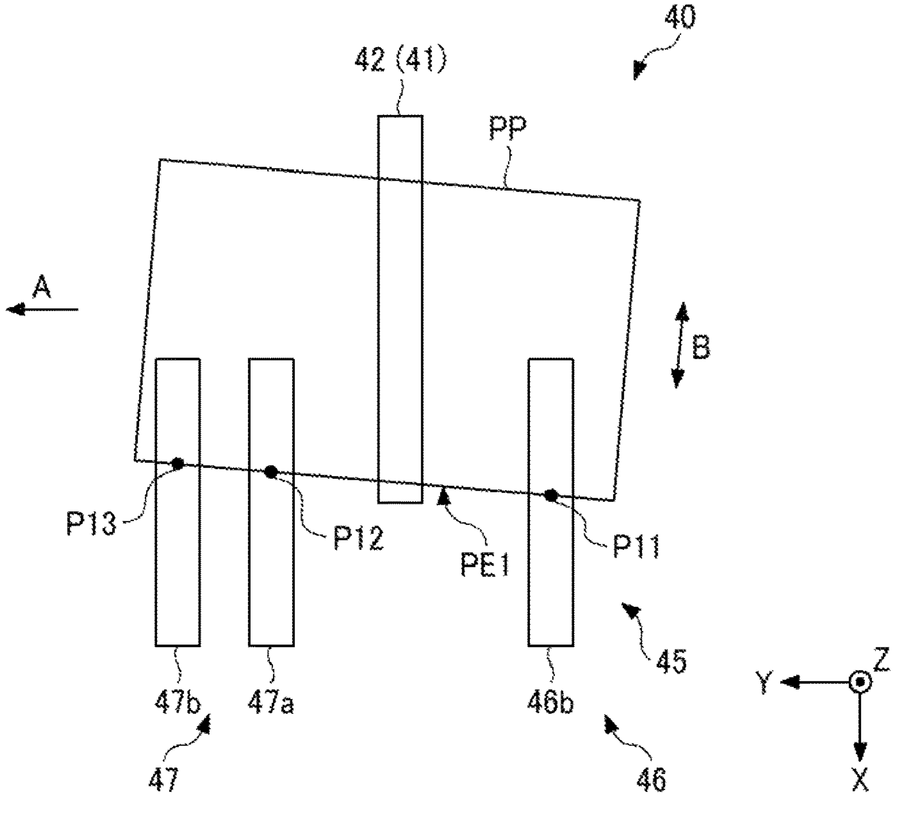
FIG. 11 is a plan view of a skewed recording medium, according to an embodiment of the present disclosure.

A description is given below of a skew detection method in the conveying device 40 with reference to FIG. 11. FIG. 11 is a plan view of the recording medium PP that is skewed, according to the present embodiment. The detector 45 detects a plurality of end positions P11 to P13 of the recording medium PP being conveyed, at the same time. The end positions P11 to P13 are located on the end PE1 of the recording medium PP in the width direction B.

The first detector 46*b* detects the end position P11. The second detector 47*a* detects the end position P12. The second detector 47*b* detects the end position P13. The first detector 46*b*, the second detector 47*a*, and the second detector 47*b* output signals related to detection results to a controller 500 illustrated in FIG. 4.

When the end positions P11 to P13 are positioned at different positions in the X axis direction and a line connecting the end positions P11 to P13 is linear (straight line), the controller 500 determines that a skew is present.

Figure 12:
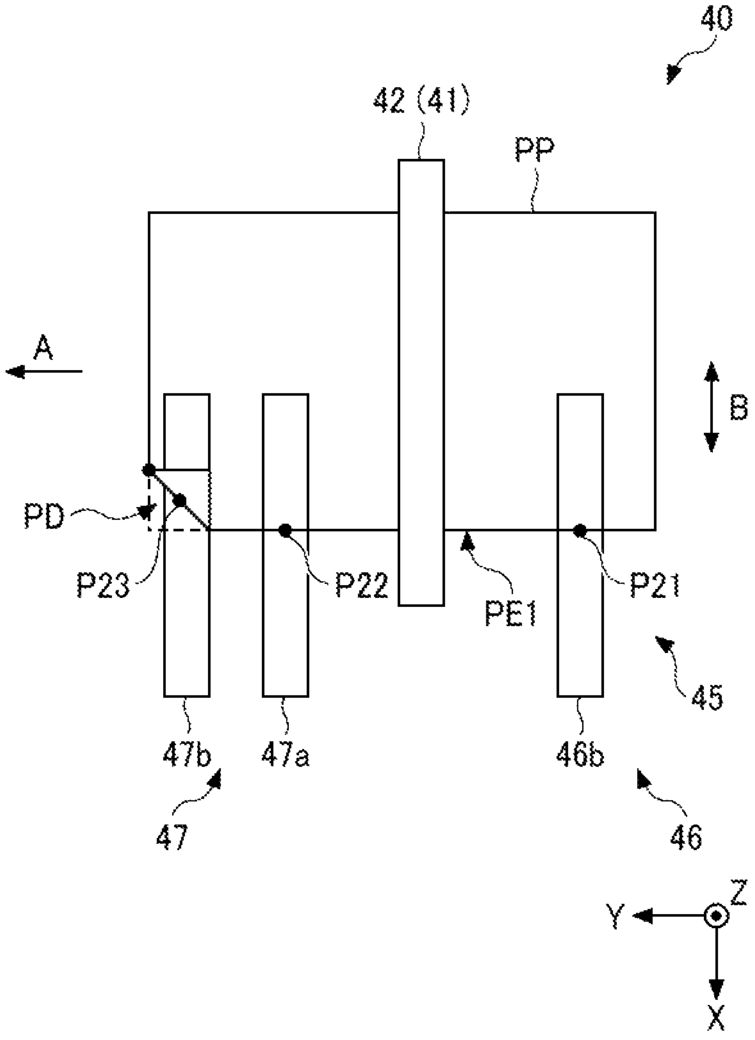
FIG. 12 is a plan view of a recording medium having a folded portion at a corner, according to an embodiment of the present disclosure.

A description is given below of a method for detecting a corner folded portion in the conveying device 40 with reference to FIG. 12. FIG. 12 is a plan view of the recording medium PP having a folded portion at a corner, according to the present embodiment. The detector 45 detects a plurality of end positions P21 to P23 of the recording medium PP being conveyed, at the same time. The end positions P21 to P23 are positioned on the end PE1 of the recording medium PP in the width direction B. The end PE1 in the width direction B includes an end extending in the longitudinal direction of the recording medium PP and an end formed by the corner folded portion PD. The end formed by the corner folded portion PD may be a polygonal line formed by folding a corner portion.

The first detector 46*b* detects the end position P21. The second detector 47*a* detects the end position P22. The second detector 47*b* detects the end position P23. The first detector 46*b*, the second detector 47*a*, and the second detector 47*b* output signals related to detection results to the controller 500 illustrated in FIG. 4.

In a case where the line connecting the end positions P21 to P23 is not a straight line, the controller 500 determines that the corner folded portion PD is present. In a case where the end positions P21 to P23 are not positioned on the same straight line, the controller 500 determines that the corner folded portion PD is present.

Figure 13:
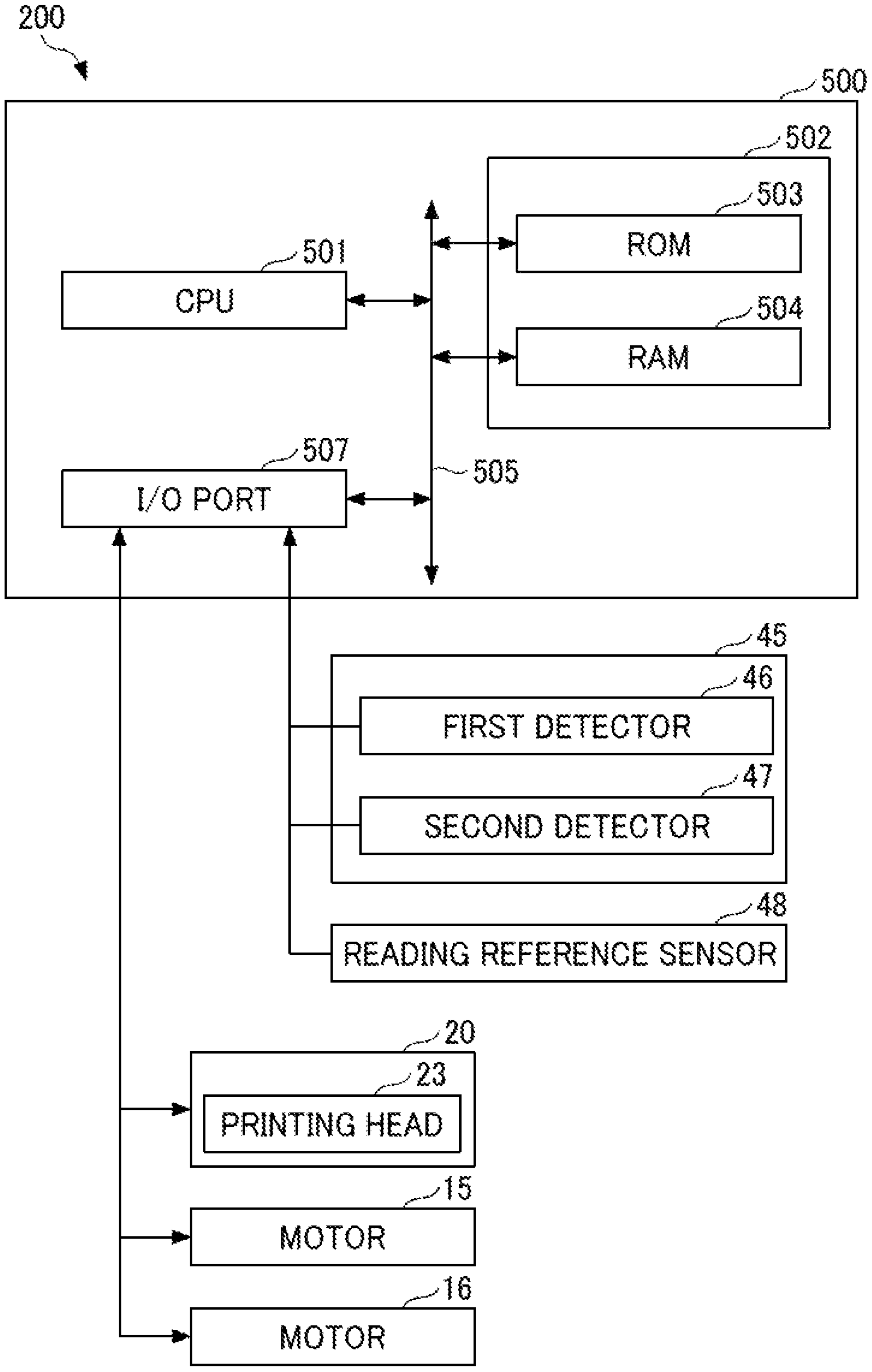
FIG. 13 is a block diagram illustrating a hardware configuration of an image forming apparatus according to an embodiment of the present disclosure.

A description is given below of a hardware configuration of the image forming apparatus 200 with reference to FIG. 13. FIG. 13 is a block diagram illustrating a hardware configuration of an image forming apparatus according to an embodiment of the present disclosure. The hardware configuration illustrated in FIG. 13 may include additional components as necessary. Hardware may not include the components illustrated in FIG. 13 as necessary.

The image forming apparatus 200 includes the controller 500. The controller 500 includes a central processing unit (CPU) 501 and a storage unit 502. The storage unit 502 includes a read only memory (ROM) 503, a random access memory (RAM) 504, a bus line 505, and an input/output (I/O) port 507.

The CPU 501 is an arithmetic device that sequentially executes branching and repeating processing by executing a program stored in the ROM 503. The CPU 501 executes the control of the entire image forming apparatus 200.

The ROM 503 is a nonvolatile memory that stores, for example, programs to be executed in the CPU 501. The RAM 504 is a memory that functions as a work area (workspace) for the operation of the CPU 501. The bus line 505 is, for example, an address bus and a data bus for electrically connecting the components such as the CPU 501. The CPU 501, ROM 503, RAM 504, and I/O port 507 are electrically connected via the bus line 505.

The I/O port 507 is an input-output unit for importing detection signals output from various sensors. The various sensors include a first detector 46 and the second detector 47. The first detector 46 and the second detector 47 are connected to the I/O port 507. Output signals from the first detector 46 and the second detector 47 are input to the I/O port 507.

The image forming apparatus 200 includes a reading reference sensor 48. The reading reference sensor 48 is connected to the I/O port 507. An output signal from the reading reference sensor 48 is input to the I/O port 507. The reading reference sensor 48 is a sensor for determining timings of detection by the first detector 46 and the second detector 47. The reading reference sensor 48 detects, for example, a position of the recording medium PP in the conveyance direction. The reading reference sensor 48 may be disposed, for example, downstream from the second detector 47*b* in the conveyance direction of the recording medium PP.

The I/O port 507 is an interface that outputs various control signals. The head module 20 and motors 15 and 16 are connected to the I/O port 507. The I/O port 507 outputs a control signal for controlling liquid discharge by the head module 20 to the head module 20.

The motor 15 is a motor for driving the drum 10. The I/O port 507 outputs a control signal for controlling an operation of the motor 15 to the motor 15.

Examples of the motor 16 include a motor for driving the shift rollers 42 and 43. Examples of the motor 16 include a motor for driving the shift rollers 42 and 43 to rotate. Examples of the motor 16 includes a motor for rotating the shift rollers 42 and 43 around the Z axis and a motor for moving the shift rollers 42 and 43 along the X axis direction.

The controller 500 may include an external interface (external I/F) that can transmit and receive, for example, data to and from a host serving as an external device. The host includes an information processing device such as a personal computer (PC), an image reading device such as an image scanner, and an imaging device such as a digital camera. The controller 500 receives data transmitted from the host. The host may include a printer driver.

The image forming apparatus 200 may include an operation panel. The operation panel is electrically connected to the controller 500. The operation panel includes a display for displaying various kinds of information. A user (operator) can perform an input operation using the operation panel. The controller 500 inputs information based on the input operation by a user from the operation panel. The controller 500 outputs various signals to the operation panel and can display information on the operation panel. The user may perform the input operation with reference to information displayed on the operation panel.

Figure 14:
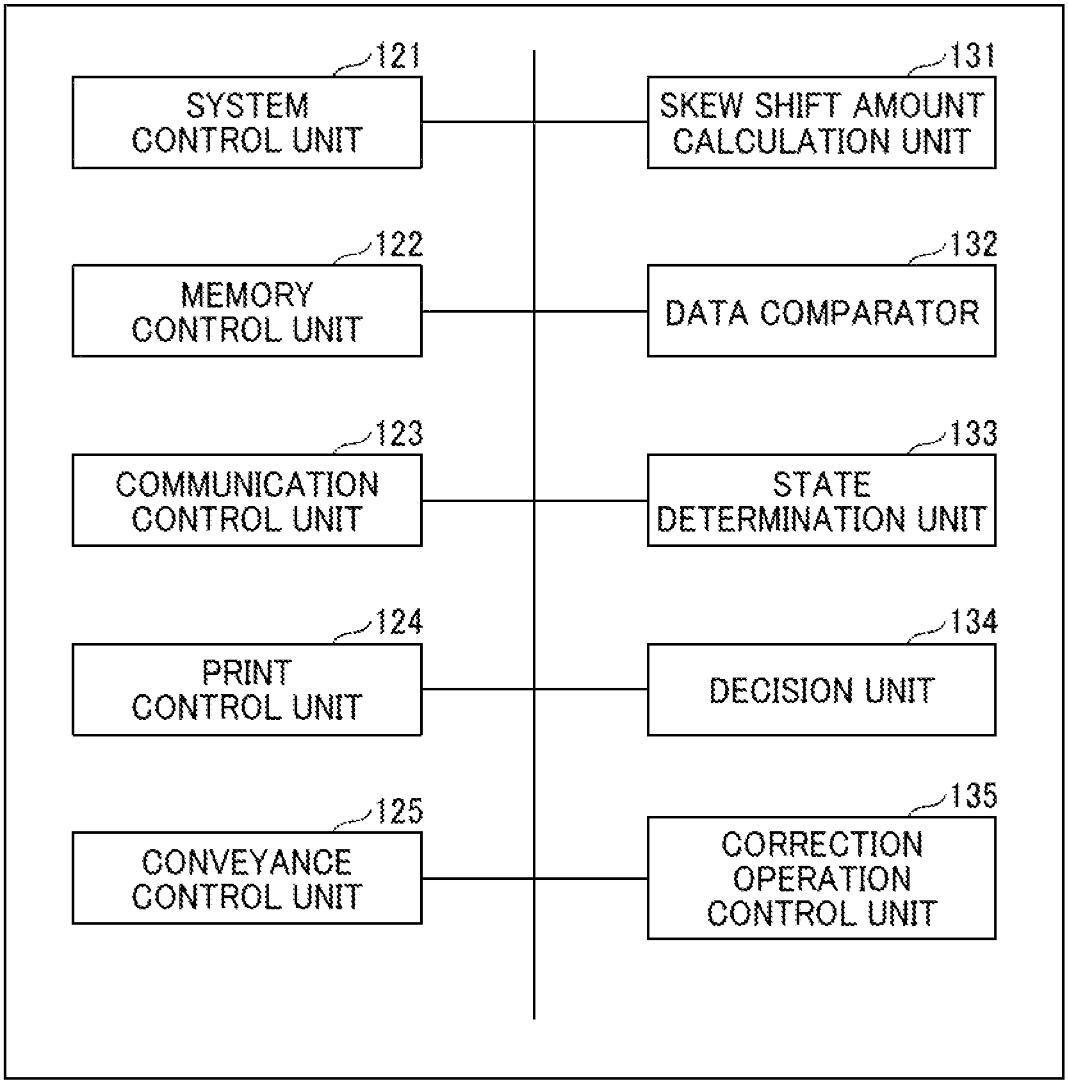
FIG. 14 is a functional block diagram of an image forming apparatus according to an embodiment of the present disclosure.

A description is given below of a functional configuration of the image forming apparatus 200 with reference to FIG. 14. FIG. 14 is a functional block diagram of the image forming apparatus 200 according to the present embodiment. The CPU 501 illustrated in FIG. 13 executes programs stored in the storage unit 502 such as the ROM 503 implements functions of a system control unit 121, a memory control unit 122, a communication control unit 123, a print control unit 124, a conveyance control unit 125, a skew shift amount calculation unit 131, a data comparator 132, a state determination unit 133, a decision unit 134, and a correction operation control unit 135 illustrated in FIG. 14. An external device and a sensor connected to the controller 500 may implement a part of the above-described functions.

The image forming apparatus 200 can receive print information (print job) including a print image from an external device. The image forming apparatus 200 receives an instruction to execute a print job from, for example, an external device, and performs printing according to the contents of the print job. The image forming apparatus 200 can perform printing according to the details of a print job stored in the storage unit 502 of the image forming apparatus 200.

The system control unit 121 controls the entire operation of the image forming apparatus 200. The memory control unit 122 controls the operation of the storage unit 502 such as the ROM 503 and the RAM 504. The storage unit 502 stores data input from the first detector 46, the second detector 47, and the reading reference sensor 48. The communication control unit 123 controls communication with an external device connected to the controller 500.

The print control unit 124 controls discharge of ink by the head module 20. The print control unit 124 executes operations of starting, temporarily stopping, restarting, and completing a print job.

The conveyance control unit 125 controls conveyance of the recording medium PP by the conveyor. The conveyor includes the drum 10 for conveying the recording medium PP, the motor 15, the shift rollers 42 and 43, and the motor 16. The conveyance control unit 125 can control driving and stopping of the conveyor.

The skew shift amount calculation unit 131 can calculate the skew amount and the shift amount of the recording medium PP. The skew shift amount calculation unit 131 can calculate the skew amount and the shift amount based on the detection signals input from the first detector 46 and the second detector 47. The skew shift amount calculation unit 131 can acquire data on the skew amount and the shift amount from the first detector 46 and the second detector 47. The skew shift amount calculation unit 131 may calculate a value other than the skew amount and the shift amount based on the detection signals input from the first detector 46 and the second detector 47.

The data comparator 132 can compare various types of data. The data comparator 132 can compare data input from the first detector 46 and the second detector 47. The data comparator 132 can compare data calculated by the skew shift amount calculation unit 131. The data comparator 132 can compare data stored in the storage unit 502.

The state determination unit 133 can determine whether a skew is present as a state of the recording medium PP. The state determination unit 133 determines whether a skew is present based on the comparison result by the data comparator 132. In a case where a line connecting the end positions P11 to P13 measured at the same time is linear, the state determination unit 133 can determine that a skew is present.

The state determination unit 133 can determine whether a corner folded portion PD is present as a state of the recording medium PP. The state determination unit 133 determines whether a corner folded portion PD is present based on the comparison result by the data comparator 132. In a case where a line connecting the end positions P21 to P23 detected at the same time is non-linear, the state determination unit 133 can determine that the corner folded portion PD is present.

The decision unit 134 can determine whether to execute the operation of correcting the posture of the recording medium PP based on the determination result by the state determination unit 133. In a case where the state determination unit 133 determines that the recording medium PP is skewed, the decision unit 134 can determine to perform the operation for correcting the posture of the recording medium PP to reduce the amount of skew. Moreover, the decision unit 134 can determine to perform an operation of correcting the position of the recording medium PP to reduce the shift amount.

The decision unit 134 can determine whether to stop the conveyance of the recording medium PP based on the determination result by the state determination unit 133. In a case where the decision unit 134 determines that a corner folded portion PD is present, the decision unit 134 can determine to stop the conveyance of the recording medium PP by the conveyor.

The correction operation control unit 135 can control the operation of correcting the posture of the recording medium PP. The correction operation control unit 135 can control the operation of the conveyor 41 to adjust the posture of the recording medium PP based on the skew amount and the shift amount.

The correction operation control unit 135 controls the operation of the shift rollers 42 and 43 to rotate the shift rollers 42 and 43 around the Z axis, thereby correcting a skew of the recording medium PP. Accordingly, the conveying device 40 can correct the posture of the recording medium PP to reduce the skew amount.

The correction operation control unit 135 controls the operation of the shift rollers 42 and 43 to move the shift rollers 42 and 43 in the X axis direction, thereby correcting the misalignment of the recording medium PP in the X axis direction. As a result, the conveying device 40 can correct the misalignment of the recording medium PP in the X axis direction to reduce the shift amount.

The system control unit 121, the memory control unit 122, the communication control unit 123, the print control unit 124, the conveyance control unit 125, the skew shift amount calculation unit 131, the data comparator 132, the state determination unit 133, the decision unit 134, and the correction operation control unit 135 can be implemented by software using programs stored in the storage unit 502. All or part of the system control unit 121, the memory control unit 122, the communication control unit 123, the print control unit 124, the conveyance control unit 125, the skew shift amount calculation unit 131, the data comparator 132, the state determination unit 133, the decision unit 134, and the correction operation control unit 135 may be implemented by hardware such as an integrated circuit (IC).

The programs may be recorded in a computer-readable recording medium such as a compact disc read only memory (CD-ROM) and a flexible disk (FD) as data in a file in an installable or executable file format, and can be provided to the image forming apparatus 200 via such a recording medium. The programs may be recorded in a computer-readable storage medium such as a compact disc-recordable (CD-R), a digital versatile disc (DVD), a Blu-ray (registered trademark) disc, or a semiconductor memory, and may be loaded into the image forming apparatus 200 via such a storage medium. The programs to be installed may be downloaded into the image forming apparatus 200 via a network such as the Internet. Alternatively, the programs may be prestored in a memory such as the ROM 503 in the image forming apparatus 200.

The controller 500 may implement the functions executed by the computer connected to the controller 500. Similarly, the computer connected to the controller 500 may implement the functions executed by the controller 500.

Figure 15:
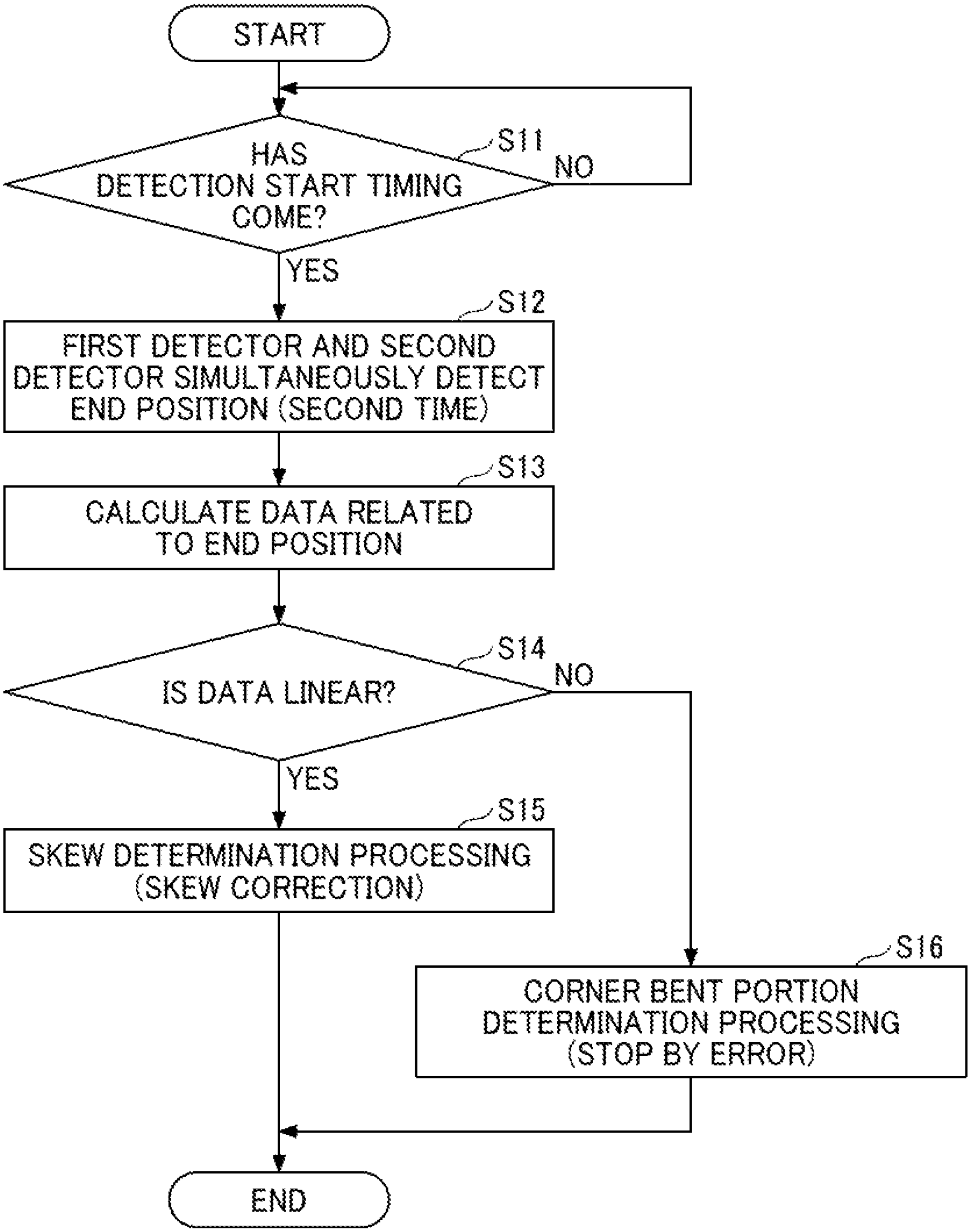
FIG. 15 is a flowchart of a procedure of operations in a controller according to an embodiment of the present disclosure.

A description is given below of a procedure of operations in the controller 500 with reference to FIG. 15. FIG. 15 is a flowchart of a procedure of operations in the controller 500 according to the present embodiment. First, the controller 500 determines whether it is a timing to start detection by the first detector 46 and the second detector 47 (in step S11 of the FIG. 15). The controller 500 determines whether it is a timing to start detection by the first detector 46 and the second detector 47 based on the signal input from the reading reference sensor 48. For example, in a case where the recording medium PP is at a position where the end position of the recording medium PP can be detected by all of the first detector 46 and the second detector 47, the controller 500 can determine that it is a timing to start the detection. In a case where the controller 500 determines that it is a timing to start detection (YES in the step S11 of the FIG. 15), the controller 500 proceeds to step S12. In a case where the controller 500 does not determine that it is a timing to start detection (NO in the step S11 of the FIG. 15), the processing of step S11 is repeated until the controller 500 determine that it is a timing to start detection.

Subsequently, the first detector 46 and the second detector 47 detect the end positions P11 to P13 and the end positions P21 to P23 of the recording medium PP at the same time (in the step S12 of the FIG. 15). The controller 500 reads detection signals from the first detector 46 and the second detector 47 at the same time. The conveying device 40 detects end positions of the recording medium PP with respect to at least three points detected at the same timing by the first detector 46 and the second detector 47.

Subsequently, the skew shift amount calculation unit 131 of the controller 500 calculates data about the end positions P11 to P13 and the end positions P21 to P23 input from the first detector 46 and the second detector 47 (in step S13 of the FIG. 15). The skew shift amount calculation unit 131 calculates a formula indicating the position of a line connecting the three points detected at the same time. The skew shift amount calculation unit 131 calculates, for example, a formula indicating a position of a line passing through the end positions P11 and P12, and a formula indicating a position of a line passing through the end positions P12 and P13.

Subsequently, the state determination unit 133 of the controller 500 determines whether a line connecting the end positions P11 to P13 and a line connecting the end positions P21 to P23 are linear (in step S14 of the FIG. 15). As illustrated in FIG. 11, in a case where the line connecting the end positions P11 to P13 is linear, the controller 500 determines that the line is linear (YES in the step S14 of the FIG. 15), and proceeds to step S15. As illustrated in FIG. 12, in a case where the line connecting the end positions P21 to P23 is not positioned on the same straight line, the controller 500 determines that the line is non-linear (NO in the step S14 of the FIG. 15), and proceeds to step S16. In a case where the line connecting the end positions P11 to P13 is linear (YES in the step S14 of the FIG. 15), the state determination unit 133 can determine that the recording medium PP is skewed. In a case where the line connecting the end positions P21 to P23 is non-linear (NO in the step S14 of the FIG. 15), the state determination unit 133 can determine that the corner folded portion PD is present on the recording medium PP.

In step S15, the controller 500 executes skew determination processing (meandering correction). The correction operation control unit 135 of the controller 500 controls the operation of the shift rollers 42 and 43 as skew determination processing to correct the posture of the recording medium PP. The skew determination processing is processing performed when the recording medium PP is skewed, and refers to processing for correcting the posture of the recording medium PP.

In step S16, the controller 500 stops the operation due to an error that a folded portion is present. More specifically, the conveyance control unit 125 of the controller 500 controls the operation of the conveyor 41 to stop the conveyance of the recording medium PP in the step S16. Then, the conveyance control unit 125 performs control to stop the operation of the motors 15 and 16 for driving the drum 10 and the conveying roller. The operation is stopped to stop the conveyance of the recording medium PP in a case where a corner folded portion PD is present on the recording medium PP. A user can remove the recording medium PP having the corner folded portion PD after conveyance of the recording medium PP. As a result, printing can be prevented from being performed on the recording medium PP with the corner folded portion PD.

After completion of the processing in the steps S15 and S16, the controller 500 ends the processing.

According to the image forming apparatus 200 as described above, the first detector 46 and the second detector 47 can detect the end positions P11 to P13 and the end positions P21 to P23 in parallel with respect to at least three points in total. Accordingly, the image forming apparatus 200 can calculate the skew amount and can determine whether the corner folded portion PD is present based on the end positions P11 to P13 and the end positions P21 to P23. In the related art, a skew and a corner folded portion PD may be erroneously determined. The image forming apparatus 200 can accurately detect whether a skew is present and a corner folded part PD is present based on at least three end positions detected at the same time.

In a case where a line connecting the end positions P11 to P13 detected at the same time is linear, the image forming apparatus 200 can determine that a skew is present. In a case where a line connecting the end positions P21 to P23 detected at the same time is non-linear, the image forming apparatus 200 can determine that a corner folded portion PD is present. Due to such determination, the image forming apparatus 200 can accurately detect whether the recording medium PP is skewed and a corner folded portion PD is present on the recording medium PP.

In a case where a skew is present, the image forming apparatus 200 corrects the posture of the recording medium PP to continue printing. In a case where a corner folded portion PD is present, the image forming apparatus 200 stops the operation to stop printing.

Second Embodiment

A description is given below of an image forming apparatus 200 according to a second embodiment. The image forming apparatus 200 according to the second embodiment is different from the image forming apparatus 200 according to the first embodiment in a point that a corner folded portion PD and a skew can be detected by a different way from the first embodiment. In the description of the second embodiment, the same description as the first embodiment is omitted.

The apparatus configuration of an image forming apparatus 200 according to the second embodiment is similar to the configuration of the image forming apparatus 200 according to the first embodiment. The image forming apparatus 200 according to the second embodiment can detect the corner folded portion PD and the skew by the same procedure as the first embodiment, and further can detect the corner folded portion PD and the skew by a procedure different from the first embodiment.

Figure 16:
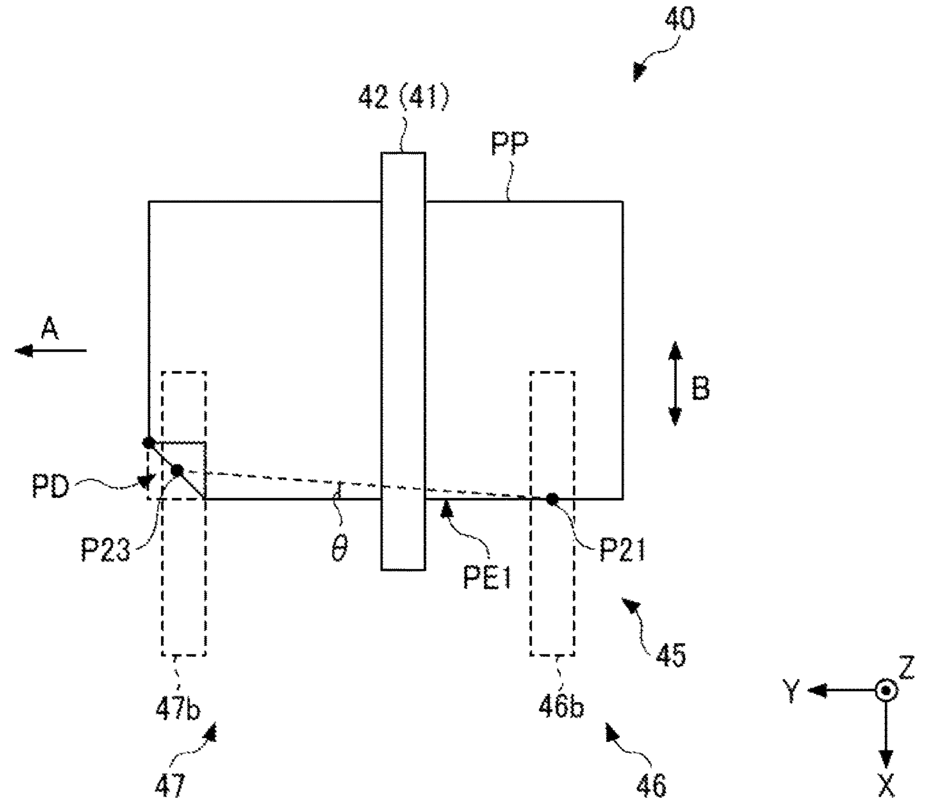
FIG. 16 is a plan view of a conveying device according to a second embodiment of the present disclosure, where a recording medium having a folded portion at a corner is being conveyed.
Figure 17:
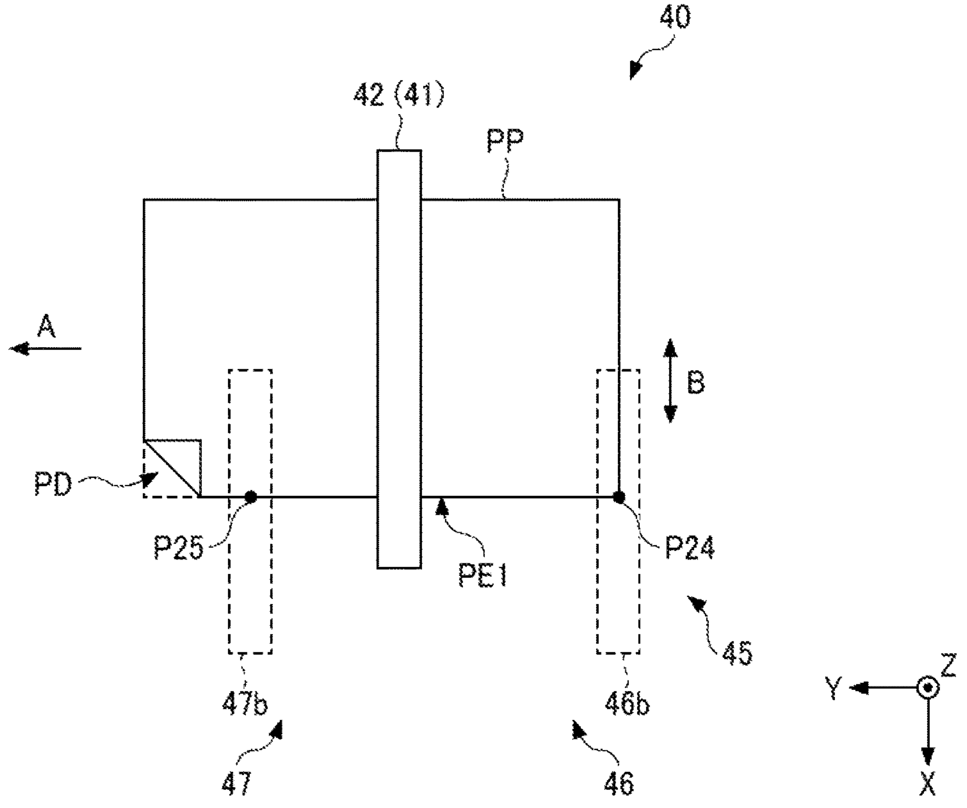
FIG. 17 is a plan view of the conveying device of FIG. 16 according to the second embodiment, where a recording medium having a folded portion at a corner is being conveyed, subsequent to FIG. 16.

FIGS. 16 and 17 are plan views of a conveying device according to the second embodiment, where a recording medium having a folded portion at a corner is being conveyed. The conveying device 40 of the image forming apparatus 200 according to the second embodiment can detect the corner folded portion PD based on detection results by the first detector 46*b* and the second detector 47*b*. The combination of the two detectors is not limited to the first detector 46*b* and the second detector 47*b*, and may be any combination of the first detectors 46*a* and 46*b* and the second detectors 47*a* and 47*b*.

FIG. 16 illustrates a state of the recording medium PP at the time t21, according to the second embodiment of the present disclosure. FIG. 17 illustrates a state of the recording medium PP at the time t22, according to the second embodiment of the present disclosure. The time t22 is a time later than the time t21. As illustrated in FIG. 16, the first detector 46*b* detects the end position P21 at the time t21. The second detector 47*b* detects the end position P23 at the time t21.

The controller 500 can calculate a line connecting the end position P21 and the end position P23 based on detection results by the first detector 46*b* and the second detector 47*b*. The controller 500 can calculate the inclination θ of the line connecting the end position P21 and the end position P23 in the Y axis direction based on detection results by the first detector 46*b* and the second detector 47*b*. The controller 500 may calculate tan θ.

As illustrated in FIG. 17, the first detector 46*b* detects the end position P24 at the time t22. The second detector 47*b* detects the end position P25 at the time t22. The end position P24 is a position more upstream than the end position P21 in the conveyance direction A of the recording medium PP. The end position P25 is a position more upstream than the end position P23 in the conveyance direction A of the recording medium PP.

The controller 500 can calculate a line connecting the end position P24 and the end position P25 based on detection results by the first detector 46*b* and the second detector 47*b*. The controller 500 can calculate the inclination θ of the line connecting the end position P24 and the end position P25 in the Y axis direction based on detection results by the first detector 46*b* and the second detector 47*b*. The controller 500 may calculate tan θ. In FIG. 17, a line connecting the end positions P24 and P25 is parallel to the Y axis direction, and θ is not illustrated.

The controller 500 can determine whether the corner folded portion PD is present by comparing the inclination of the line connecting the end positions P21 and P23 at the time t21 with the inclination of the line connecting the end positions P24 and P25 at the time t22. In a case where the inclination at the time t21 and the inclination at the time t22 are different from each other, the controller 500 can determine that a corner folded portion PD is present. For example, when the inclination decreases, the controller 500 may determine that a corner folded portion PD is present on the front side of the recording medium PP.

Figure 18:
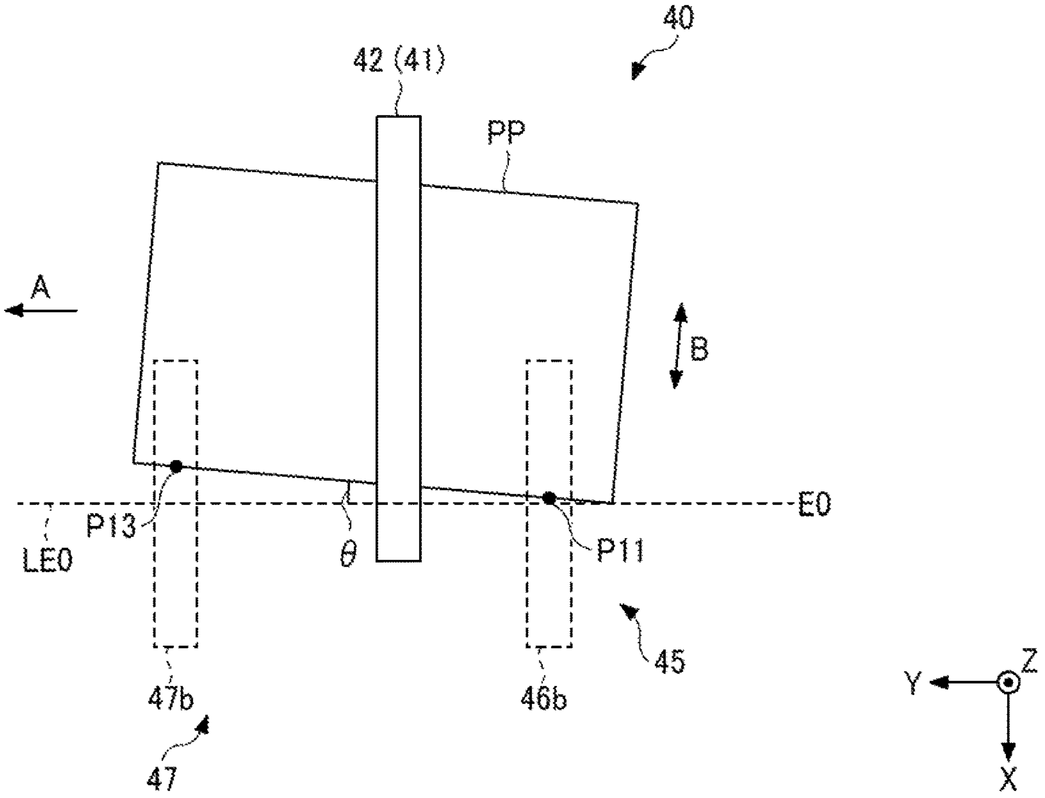
FIG. 18 is a plan view of the conveying device of FIG. 16 according to the second embodiment, where a skewed recording medium is being conveyed.
Figure 19:
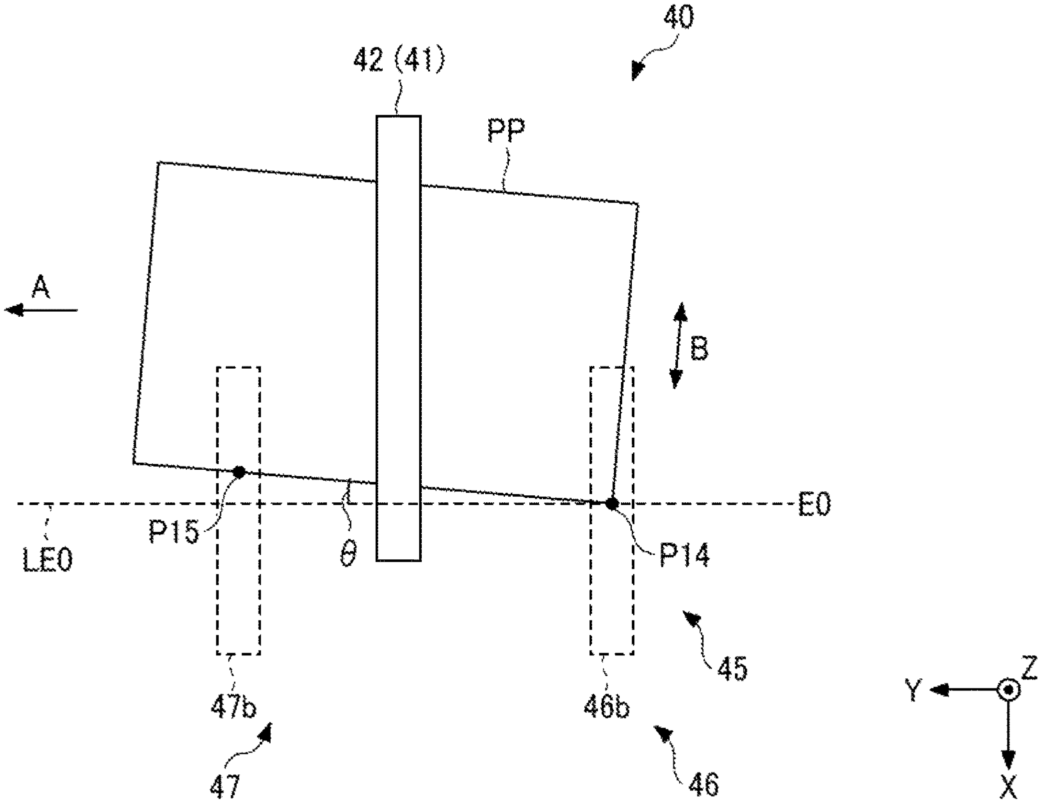
FIG. 19 is a plan view of the conveying device according to the second embodiment, where a skewed recording medium is being conveyed, subsequent to FIG. 18.

FIGS. 18 and 19 are plan views of the conveying device according to the second embodiment, where a skewed recording medium is being conveyed. The conveying device 40 of the image forming apparatus 200 according to the second embodiment can detect a skew based on detection results by the first detector 46*b* and the second detector 47*b*.

FIG. 18 illustrates a state of the recording medium PP at the time t23. FIG. 19 illustrates a state of the recording medium PP at the time t24. The time t23 is a time later than the time t24. As illustrated in FIG. 18, the first detector 46*b* detects the end position P11 at the time t23. The second detector 47*b* detects the end position P13 at the time t23.

The controller 500 can calculate the line connecting the end position P11 and the end position P13 based on detection results by the first detector 46*b* and the second detector 47*b*. The controller 500 can calculate the inclination θ of the line connecting the end position P11 and the end position P13 in the Y axis direction based on detection results by the first detector 46*b* and the second detector 47*b*. The controller 500 may calculate tan θ.

As illustrated in FIG. 19, the first detector 46*b* detects an end position P14 at the time t24. The second detector 47*b* detects an end position P15 at the time t24. The end position P14 is a position more upstream than the end position P11 in a conveyance direction of the recording medium PP. The end position P15 is a position more upstream than the end position P13 in the conveyance direction of the recording medium PP.

The controller 500 can calculate the line connecting the end position P14 and the end position P15 based on detection results by the first detector 46*b* and the second detector 47*b*. The controller 500 can calculate the inclination θ of the line connecting the end position P14 and the end position P15 in the Y axis direction based on detection results by the first detector 46*b* and the second detector 47*b*. The controller 500 may calculate tan θ.

The controller 500 can determine whether a corner folded portion PD is present by comparing the inclination of the line connecting the end positions P11 and P13 at the time t23 with the inclination of the line connecting the end positions P14 and P15 at the time t24. In a case where the inclination at the time t23 and the inclination at the time t24 are same, the controller 500 can determine that a corner folded portion PD is not present. In a case where the inclination at the time t23 and the inclination at the time t24 are same, the controller 500 can determine that the skew is present instead of the corner folded portion PD.

Figure 20:
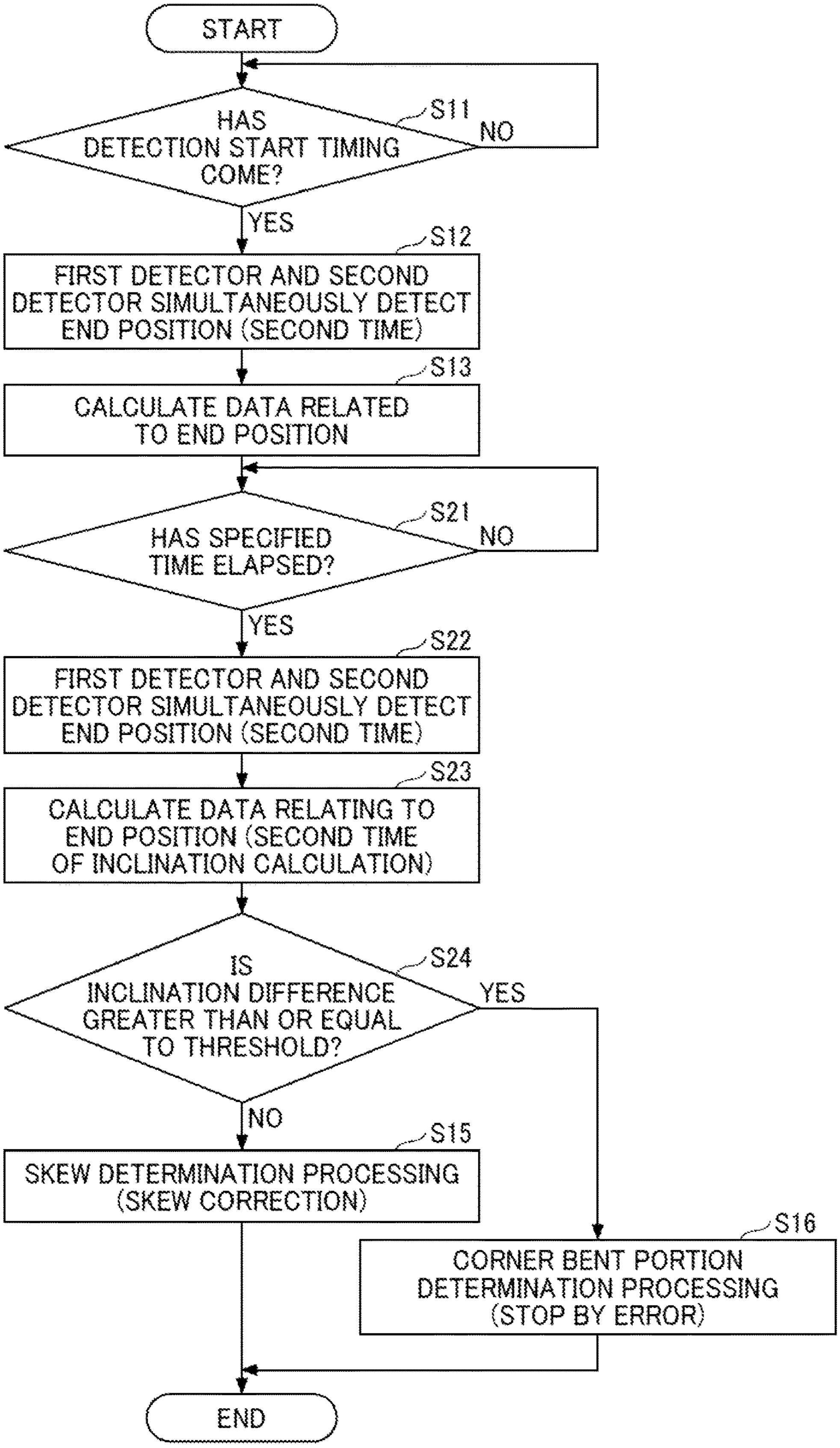
FIG. 20 is a flowchart of a procedure of an operation of a controller of an image forming apparatus according to the second embodiment.

A description is given below of the operation of a controller of the image forming apparatus 200 according to the second embodiment with reference to FIG. 20. FIG. 20 is a flowchart of a procedure of operations of a controller of the image forming apparatus 200 according to the second embodiment. The same processing as the processing of the flowchart illustrated in FIG. 15 is denoted by the same step number, and description thereof may be omitted. In the flowchart illustrated in FIG. 20, steps S11 to S13, S15, and S16 perform the same processing as the flowchart illustrated in FIG. 15.

First, the controller 500 determines whether it is a timing to start detection by the first detector 46 and the second detector 47 (in step S11 of the FIG. 15). The first detector 46 and the second detector 47 detect the end positions P11, P13, P21, and P23 of the recording medium PP at the same time (in the step S12 of the FIG. 20). The skew shift amount calculation unit 131 calculates data regarding the end positions P11, P13, P21, and P23 input from the first detector 46 and the second detector 47 (in the step S13 of the FIG. 20).

After execution of the step 13, the controller 500 waits for a specified time to elapse and proceeds to step S22. During the lapse of the fixed time, the recording medium PP moves in the conveyance direction A.

Subsequently, the first detector 46 and the second detector 47 detect the end positions P14, P15, P24, and P25 of the recording medium PP at the same time (in the step S22 of the FIG. 20). The skew shift amount calculation unit 131 calculates data with respect to the end positions P14, P15, P24, and P25 input from the first detector 46 and the second detector 47 (in step S23 of the FIG. 20).

Subsequently, the controller 500 determines whether the inclination difference is equal to or more than a threshold value (in step S24 of the FIG. 20). For example, as illustrated in FIGS. 16 and 17, in a case where a difference between the inclination of the straight line connecting the end positions P23 and P21 and the inclination of the straight line connecting the end positions P25 and P24 is equal to or more than a threshold value, the controller 500 proceeds to the step S16. In step S16, the controller 500 stops the operation due to an error that a folded portion is present.

For example, as illustrated in FIGS. 18 and 19, in a case where a difference between the inclination of the straight line connecting the end positions P13 and P11 and the inclination of the straight line connecting the end positions P14 and P15 is equal to or more than a threshold value, the controller 500 proceeds to the step S15. In step S15, the controller 500 executes skew determination processing (meandering correction).

In the image forming apparatus 200 according to the second embodiment, the detector 45 includes the first detector 46*b* and the second detector 47*b* disposed at different positions in the conveyance direction A. The first detector 46*b* detects end positions (first end positions) P11, P14, P21, and P24. The second detector 47*b* detects end positions (second end positions) P13, P15, P23, and P25. The first detector 46*b* and the second detector 47*b* detect the first end positions and the second end positions at the same time.

Specifically, the first detector 46*b* and the second detector 47*b* detect the end positions P21 and P23 at the same time (see FIG. 16). The first detector 46*b* and the second detector 47*b* detect the end portion positions P24 and P25 at the same time (see FIG. 17).

The first detector 46*b* and the second detector 47*b* detect the end positions P11 and P13 at the same time (see FIG. 18). The first detector 46*b* and the second detector 47*b* detect the end positions P14 and P15 at the same time (see FIG. 18).

According to the image forming apparatus 200 as described above, the image forming apparatus 200 can detect the skew and the corner folded portion PD by using the first detector 46*b* and the second detector 47*b*. The image forming apparatus 200 detects the end positions by using the first detector 46*b* and the second detector 47*b* at the same time. The image forming apparatus 200 performs the above-described detection by a plurality of times. Thus, the image forming apparatus 200 detects the skew and the corner folded portion PD by using data of the end positions continuously detected at different times. As a result, the configuration of the detector 45 can be simplified, and cost reduction can be achieved.

Third Embodiment

Figure 21:
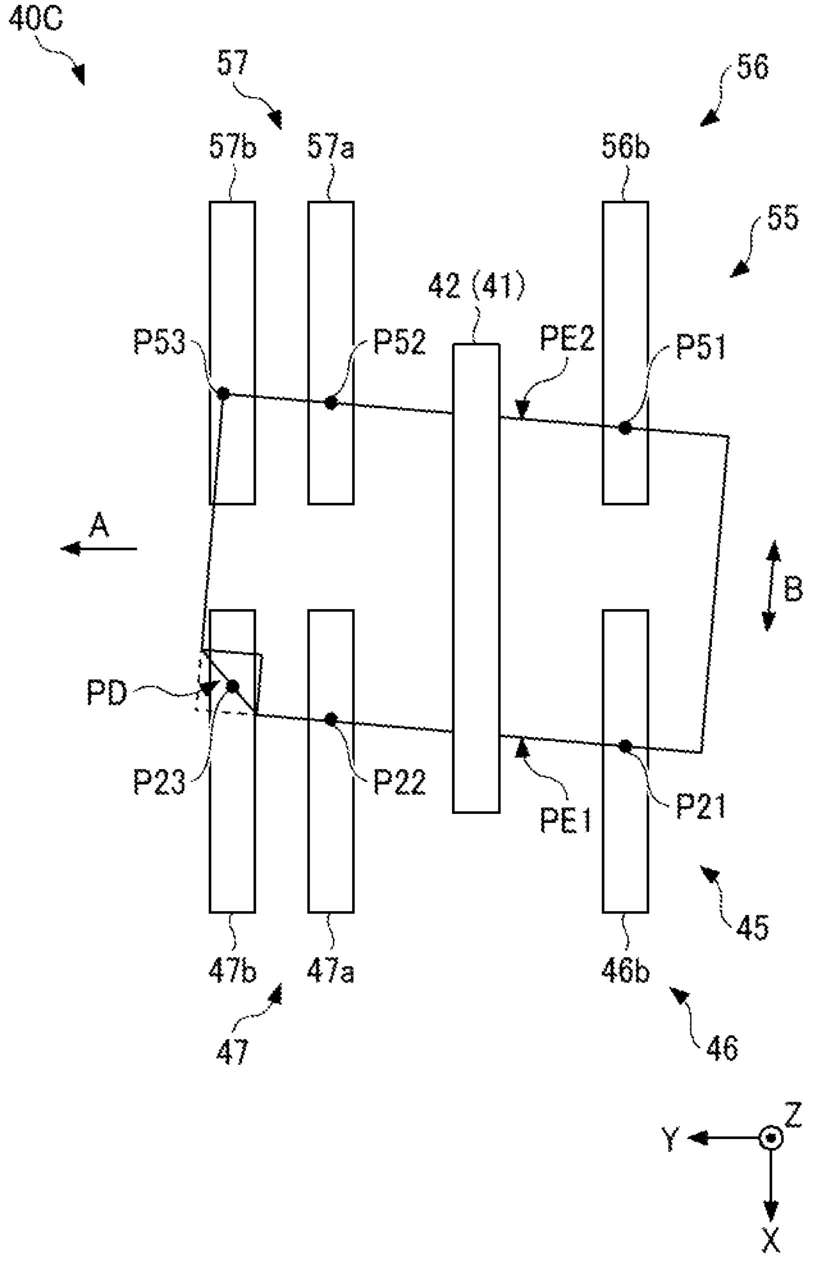
FIG. 21 is a plan view of a conveying device according to a third embodiment of the present disclosure, where a recording medium having a folded portion at a corner is being conveyed.

A description is given below of a conveying device 40C according to a third embodiment. FIG. 21 is a plan view of the conveying device according to the third embodiment, where a skewed recording medium having a folded portion at a corner is being conveyed. A conveying device 40C according to the third embodiment illustrated in FIG. 21 is different from the conveying device 40 according to the first embodiment illustrated in FIG. 11 in a point that a detector 55 is disposed facing the detector 45 in the width direction B. In the description of the third embodiment, a description similar to the descriptions of the first and second embodiments described above may be omitted.

The conveying device 40C includes detectors 45 and 55 that face each other in the X axis direction. The detector 55 has a similar configuration to the detector 45 except for the arrangement. The detector 55 includes a first detector 56 and a second detector 57. The first detector 56 is disposed upstream from the shift roller 42 in the conveyance direction A. The second detector 57 is disposed downstream from the shift roller 42 in the conveyance direction A.

The first detector 56 includes a first detector 56*b*. The first detector 56*b* is disposed opposite to the first detector 46*b* in the X axis direction. The first detector 56*b* can detect an end position P51. The end position P51 is positioned on an end PE2 in the width direction B. The end PE2 faces the end PE1 in the width direction B.

The second detector 57 includes second detectors 57*a* and 57*b*. The second detector 57*a* is disposed upstream from the second detector 57*b* in the conveyance direction A. The second detector 57*a* is disposed opposite to the second detector 47*a* in the X axis direction. The second detector 57*a* can detect an end position P52. The end position P52 is located on the end PE2 in the width direction B.

The second detector 57*b* is disposed opposite to the second detector 47*b* in the X axis direction. The second detector 57*b* can detect an end position P53. The end position P53 is positioned on the end PE2 in the width direction B. The detectors 45 and 55 detect the end positions P21 to P23 and the end positions P51 to P53 at the same time.

For example, the corner folded portion PD is formed at the end PE1 of the recording medium PP illustrated in FIG. 21, and no corner folded portion PD is formed at the end PE2 opposite to the end PE1. Moreover, the recording medium PP is skewed in FIG. 21. In such a case, the conveying device 40C can detect the corner folded portion PD based on a detection result by the detector 45. The conveying device 40C can detect a skew based on a detection result by the detector 55.

Such a conveying device 40C according to the third embodiment includes the detectors 45 and 55 disposed facing each other in the width direction B to detect the states of the end portions PE1 and PE2, which are on both sides of the recording medium PP and face each other in the width direction B, at the same time. The conveying device 40C can control the operation of the conveyor 41 based on a detection result.

Fourth Embodiment

Figure 22:
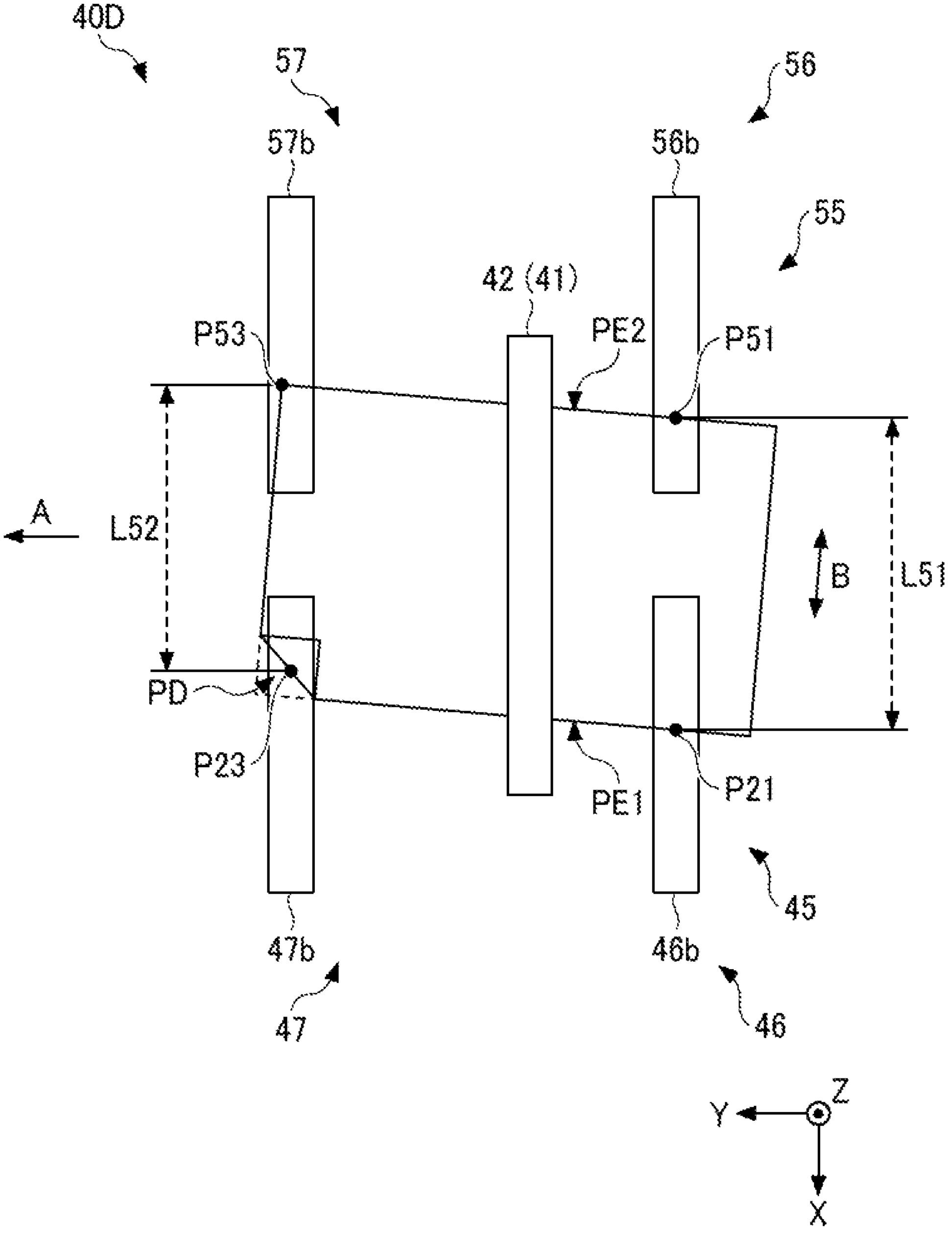
FIG. 22 is a plan view of a conveying device according to a fourth embodiment of the present disclosure, where a skewed recording medium having a folded portion at a corner is being conveyed.
Figure 23:
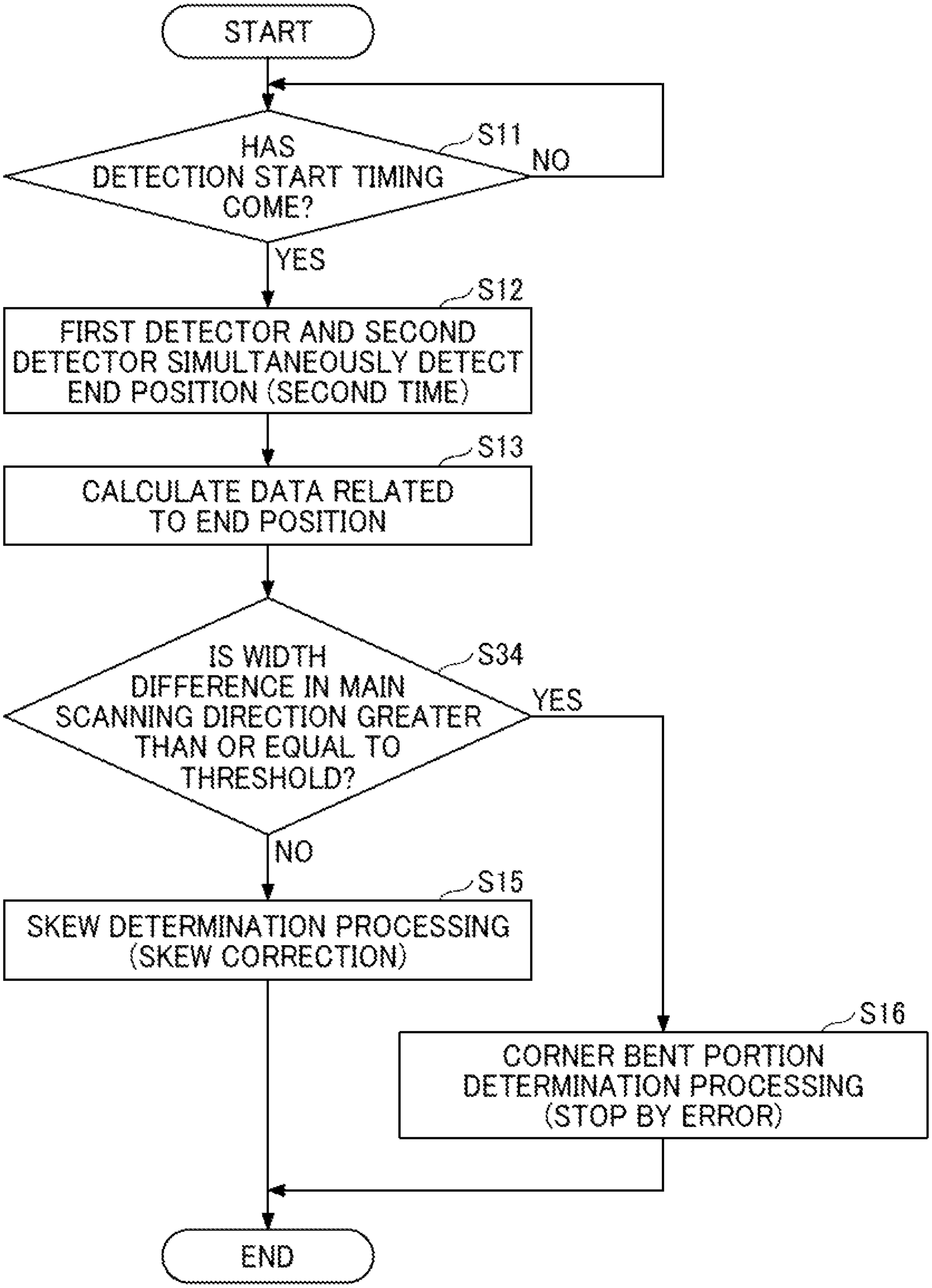
FIG. 23 is a flowchart of a procedure of operations in a controller of the conveying device according to the fourth embodiment.

A description is given below of a conveying device 40D according to a fourth embodiment. FIG. 22 is a plan view of the conveying device according to the fourth embodiment, where a skewed recording medium having a folded portion at a corner is being conveyed. FIG. 23 is a flowchart of a procedure of operations of the controller of the conveying device 40D according to the fourth embodiment. The conveying device 40D according to the fourth embodiment illustrated in FIG. 22 is different from the conveying device 40C according to the third embodiment illustrated in FIG. 21 in the number of detectors 45 and 55 and in the method of detecting a skew and a corner folded portion. In the description of the fourth embodiment, a description similar to the descriptions of the first and second embodiments described above may be omitted.

As illustrated in FIG. 22, the conveying device 40D includes the detectors 45 and 55. The detector 45 includes the first detector 46*b* and the second detector 47*b*. The detector 55 includes the first detector 56*b* and the second detector 57*b*. The detectors 45 and 55 can detect the end positions P21, P23, P51, and P53 at the same time.

For example, the corner folded portion PD is formed at the end PE1 of the recording medium PP illustrated in FIG. 22, and no corner folded portion PD is formed at the end PE2 opposite to the end PE1. Moreover, the recording medium PP is skewed in FIG. 21.

The conveying device 40D detects lengths L51 and L52 of the recording medium PP in the X axis direction in a plurality of positions based on detection results by the detectors 45 and 55, and can detect the skew and the corner folded portion PD. The controller 500 of the conveying device 40D calculates a length L51 between the end positions P21 and P51 in the X axis direction. The controller 500 calculates a length L52 between the end positions P23 and P53 in the X axis direction. The X axis direction is an example of a main scanning direction. The main scanning direction is a direction that intersects with the conveyance direction A and a thickness direction of the recording medium PP. As illustrated in FIG. 3, the head module 20 extends in the main scanning direction.

The controller 500 calculates a difference between the lengths L51 and L52 of the recording medium PP in the X axis direction, and detects the corner folded portion PD in a case where the difference between the lengths L51 and 52 is equal to or more than a threshold value.

A description is given below of a procedure of operations in the controller 500 of the conveying device 40D according to the fourth embodiment with reference to the flowchart of FIG. 23. FIG. 23 is a flowchart of a procedure of operations of the controller of the conveying device 40D according to the fourth embodiment. The same processing as the processing of the flowchart illustrated in FIG. 15 is denoted by the same step number, and description thereof may be omitted. In the flowchart illustrated in FIG. 23, the steps S11 to S13, S15, and S16 perform the same processing as the flowchart illustrated in FIG. 15.

In the fourth embodiment, the controller 500 executes processing of step S34 subsequent to processing of the step S13. In the step S34, the controller 500 calculates a difference between the lengths L51 and L52 of the recording medium PP in the main scanning direction (X axis direction), and determines whether the difference between the lengths L51 and L52 is equal to or more than a threshold value.

In a case where the difference between the lengths L51 and L52 of the recording medium PP in the main scanning direction is equal to or more than a threshold value (YES in the step S34 of FIG. 23), the controller 500 proceeds to step S16. In step S16, the controller 500 stops the operation due to an error that a folded portion is present.

In a case where the difference between the lengths L51 and 52 of the recording medium PP in the main scanning direction is less than the threshold value (NO in the step S34 of FIG. 23), the controller 500 proceeds to step S15. In step S15, the controller 500 executes skew determination processing (meandering correction).

In such a conveying device 40D according to the fourth embodiment, the controller 500 calculates the lengths L51 and L52 of the recording medium PP in the width direction B based on the end positions facing in the width direction B at two different points in the conveyance direction A, and can detect the skew and the corner folded portion PD of the recording medium PP based on the calculated lengths L51 and L52 at the two points. According to the conveying device 40D as described above, the controller 500 can detect the skew and the corner folded portion PD by one time of detection by the detectors 45 and 55. As a result, the conveying device 40D can simplify the processing in the controller 500 to reduce the load in the controller 500.

The present disclosure is not limited to the above-described embodiments, and numerous additional modifications and variations are possible without departing from or changing the technical scope of the present disclosure.

The image forming apparatus 200 according to any of the embodiments described above is satisfactory as long as it can detect at least three end positions at the same time. Alternatively, four or more end positions may be detected at the same time. Alternatively, the image forming apparatus 200 may detect the skew and the corner folded portion PD of the recording medium PP by using two of the three detected end positions in a configuration in which the end positions can be detected at the same time with respect to at least three points.

The width direction B of the recording medium PP may not be orthogonal to the conveyance direction A of the recording medium PP. For example, in a case where the recording medium PP is inclined with respect to the conveyance direction A, the width direction B is inclined with respect to the conveyance direction A. In a case where the recording medium PP is inclined, the length of the recording medium PP in the width direction B may be a length in a direction (X axis direction) orthogonal to the conveyance direction A (Y axis direction).

Each of the functions that are performed by the controller 500 of the above-described embodiments can be implemented by one or more processing circuits or circuitry. The one or more processing circuits herein includes, for example, devices such as a processor programmed to execute software to implement functions, like a processor with electronic circuits, an application-specific integrated circuit (ASIC) that is designed to execute the above functions, a digital signal processor (DSP), a field-programmable gate array (FPGA), and a circuit module or circuit components known in the art designed to execute the recited functions.

Aspects of the present disclosure may be, for example, as follows.

First Aspect

In a first aspect, a conveying device (e.g., the conveying device 40) includes a conveyor (e.g., the conveyor 41), a controller (e.g., the controller 500), and a detector (e.g., the detector 45). The conveyor conveys a recording medium (e.g., the recording medium PP) in a conveyance direction. The controller (e.g., the controller 500) controls an operation of the conveyor. The detector can detect a skew amount and a shift amount of a posture of the recording medium to be sent to the conveyor. The detector can detect, in parallel, end positions of the recording medium (e.g., the recording medium PP) in a width direction intersecting with the conveyance direction, at at least three different points in the conveyance direction with respect to one end of the recording medium in the width direction. The controller can detect a corner folded portion (e.g., the corner folded portion PD)

of the recording medium based on the end positions of the recording medium in the width direction detected at the at least three different points and control an operation of the conveyor in accordance with the skew amount, the shift amount, and the corner folded portion.

Second Aspect

In a second aspect, in the conveying device (e.g., the conveying device 40) according to the first aspect, the detector (e.g., the detector 45) includes a first detector (e.g., the first detector 46) and a second detector (e.g., the second detector 47) disposed at different positions in the conveyance direction. The first detector detects a first end position corresponding to one of the at least three different points. The second detector detects a second end position corresponding to one of the at least three different points. The first detector and the second detector detect the first end position and the second end position at the same time.

Third Aspect

In a third aspect, in the conveying device (e.g., the conveying device 40) according to the first or second aspect, the detector (e.g., the detector 45) includes a plurality of detectors (e.g., the first detector 46 and the second detector 47) disposed facing each other in the width direction. In a case where the end positions based on the detection result by the detector are not on a straight line, the controller (e.g., the controller 500) detects the corner folded portion (e.g., the corner folded portion PD) controls the operation of the conveyor (e.g., the conveyor 41) according to the detected corner folded portion.

Fourth Aspect

In a fourth aspect, in the conveying device (e.g., the conveying device 40) according to any one of the first to third aspects, the detector (e.g., the detector 45) and another detector are disposed facing each other in the width direction. The controller (e.g., the controller 500) calculates lengths of the recording medium (e.g., the recording medium PP) in the width direction at two different points in the conveyance direction, based on end positions of the recording medium facing each other in the width direction. The controller detects the posture of the recording medium and the corner folded portion (e.g., the corner folded portion PD) based on the calculated lengths of the recording medium in the width direction at the two different positions. The controller controls the operation of the conveyor (e.g., the conveyor 41) according to the posture of the recording medium and the corner folded portion.

Fifth Aspect

In a fifth aspect, an image forming apparatus (e.g., the image forming apparatus 200) includes the conveying device (e.g., the conveying device 40) according to any one of the first to fourth aspects, and an image forming device including a discharge head (e.g., the recording head 23) to discharge liquid onto the recording medium (e.g., the recording medium PP) conveyed by the conveying device to form an image on the recording medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A conveying device comprising:

a conveyor to convey a recording medium in a conveyance direction;

a detector to:

detect a skew amount and a shift amount of a posture of the recording medium to be sent to the conveyor; and detect, in parallel, end positions of the recording medium in a width direction of the recording medium intersecting with the conveyance direction, at at least three different points in the conveyance direction on one end of the recording medium in the width direction; and circuitry configured to:

control an operation of the conveyor; and cause the detector to detect a corner folded portion of the recording medium based on the end positions of the recording medium in the width direction detected at the at least three different points.

2. The conveying device according to claim 1, wherein the detector includes a first sensor and a second sensor disposed at different positions in the conveyance direction, wherein the first sensor detects a first end position that is one of the end positions of the recording medium detected at the at least three different point, wherein the second sensor detects a second end position that is another of the end positions of the recording medium detected at the at least three different point, and wherein the first sensor and the second sensor detect the first end position and the second end position simultaneously.

3. The conveying device according to claim 1, wherein the detector includes a plurality of sensors disposed facing each other in the width direction, and wherein the circuitry, in a case where the end positions detected by the detector are not on a straight line, causes the detector to detect the corner folded portion and controls the operation of the conveyor according to the detected corner folded portion.

4. The conveying device according to claim 1, wherein the detector includes a plurality of sensors disposed facing each other in the width direction, wherein the circuitry calculates lengths of the recording medium in the width direction at two different points in the conveyance direction, based on end positions of the recording medium facing each other in the width direction, wherein the circuitry detects the posture of the recording medium and the corner folded portion based on the calculated lengths of the recording medium in the width direction at the two different points, and wherein the circuitry controls the operation of the conveyor in accordance with the posture of the recording medium and the corner folded portion.

5. An image forming apparatus comprising:

the conveying device according to claim 1, and a discharge head to discharge liquid on the recording medium conveyed by the conveying device.

* * * * *